Figure 3B:
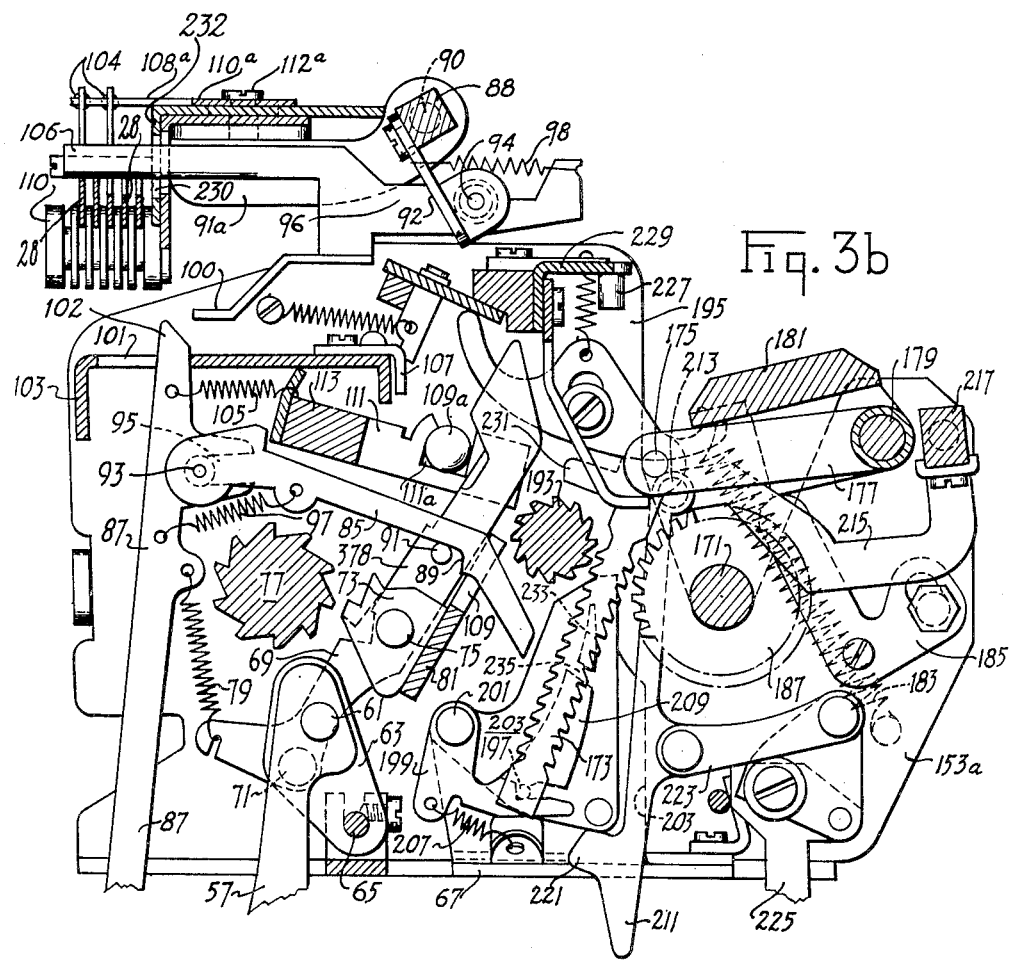

April 29, 1952     O. J. SUNDSTRAND     2,595,020
INTERLOCK BETWEEN CONTROL MEMBERS AND REGISTER
ANALYZING MECHANISM IN TYPEWRITER-COMPUTERS
Filed July 28, 1948     17 Sheets-Sheet 1

INVENTOR
OSCAR J. SUNDSTRAND
BY Jesse A. Holton
ATTORNEY

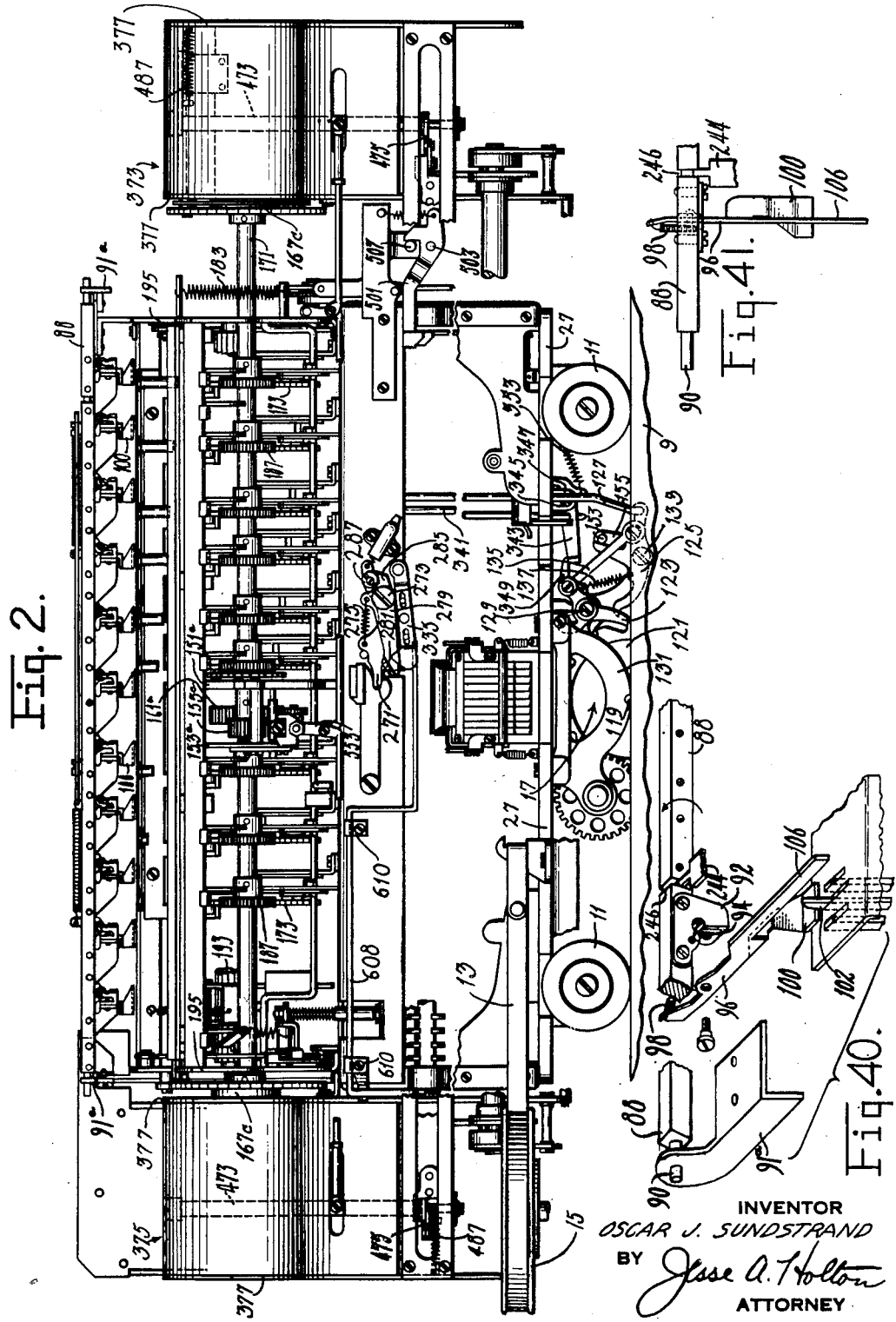

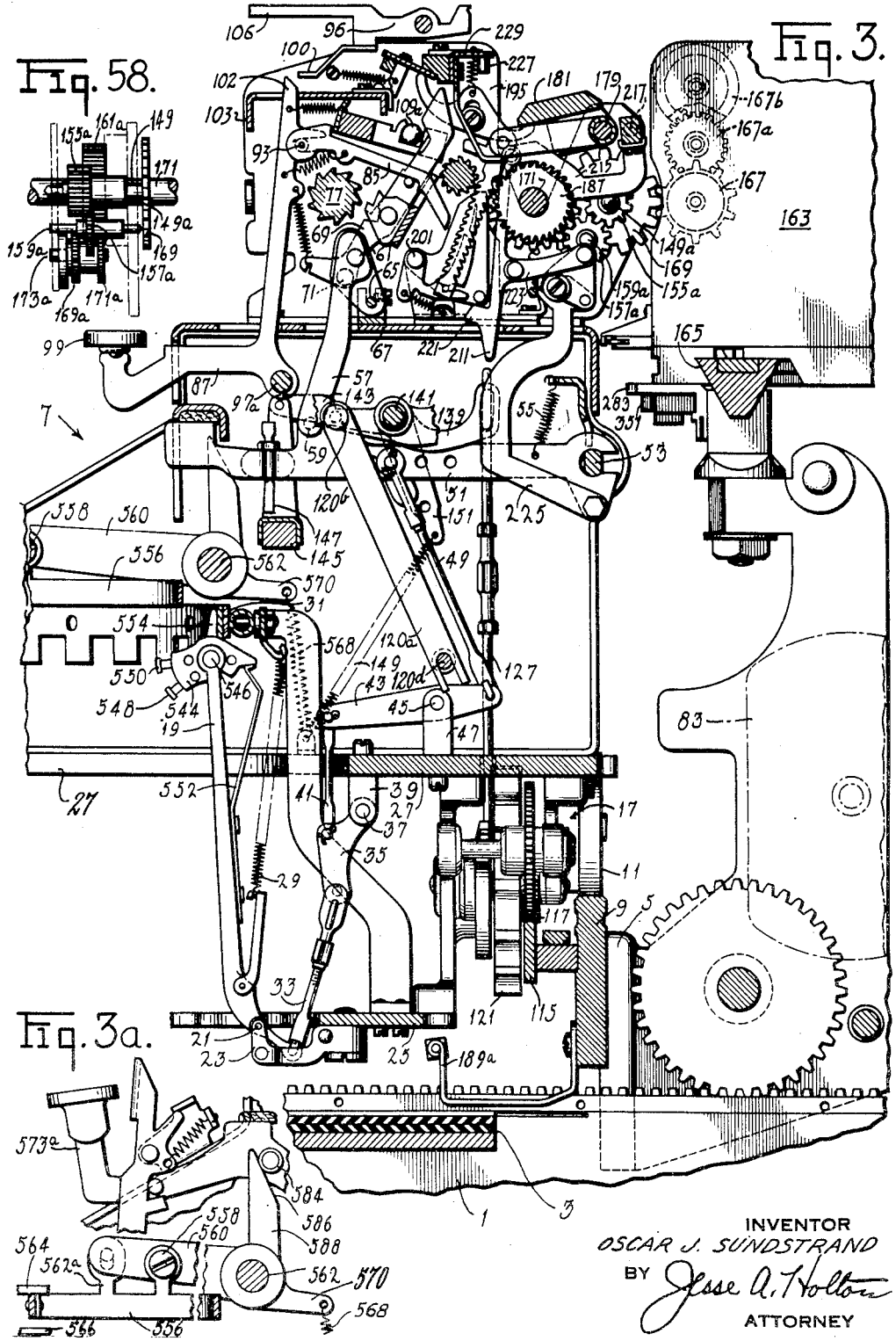

INVENTOR
OSCAR J. SUNDSTRAND
BY Jesse A. Holton
ATTORNEY

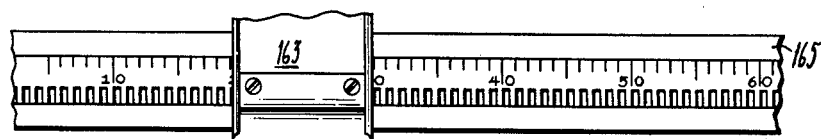
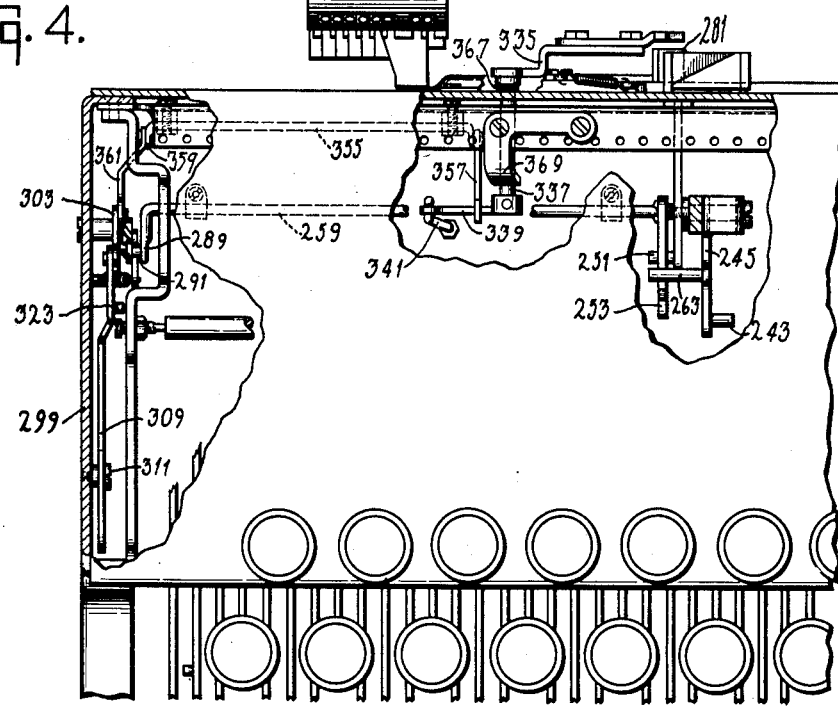
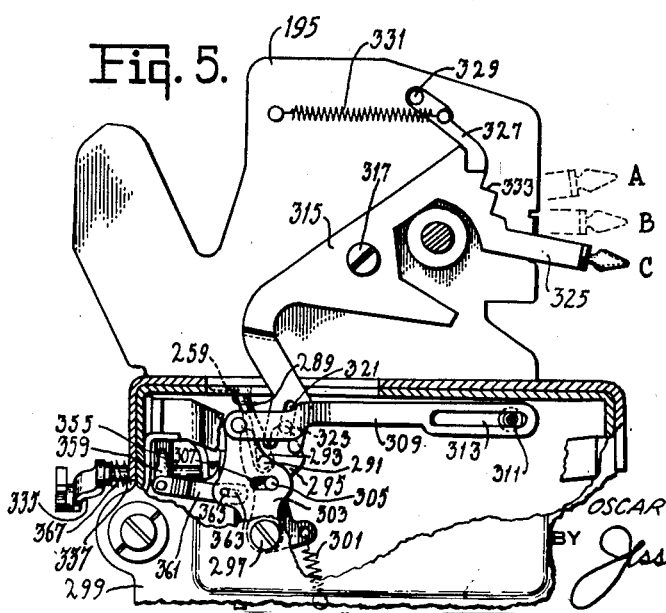

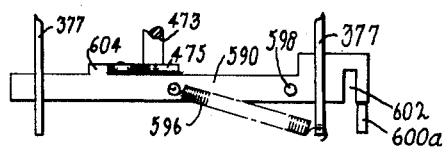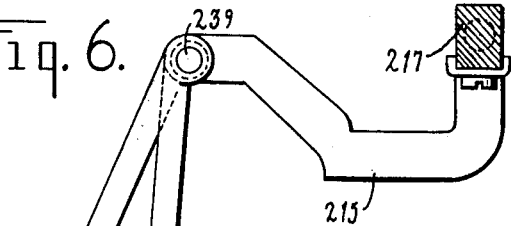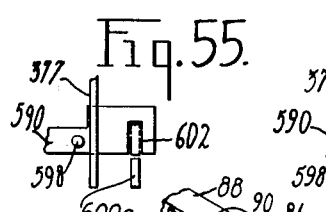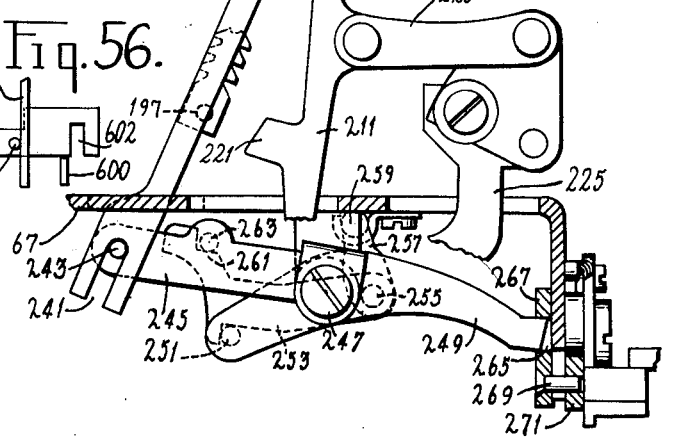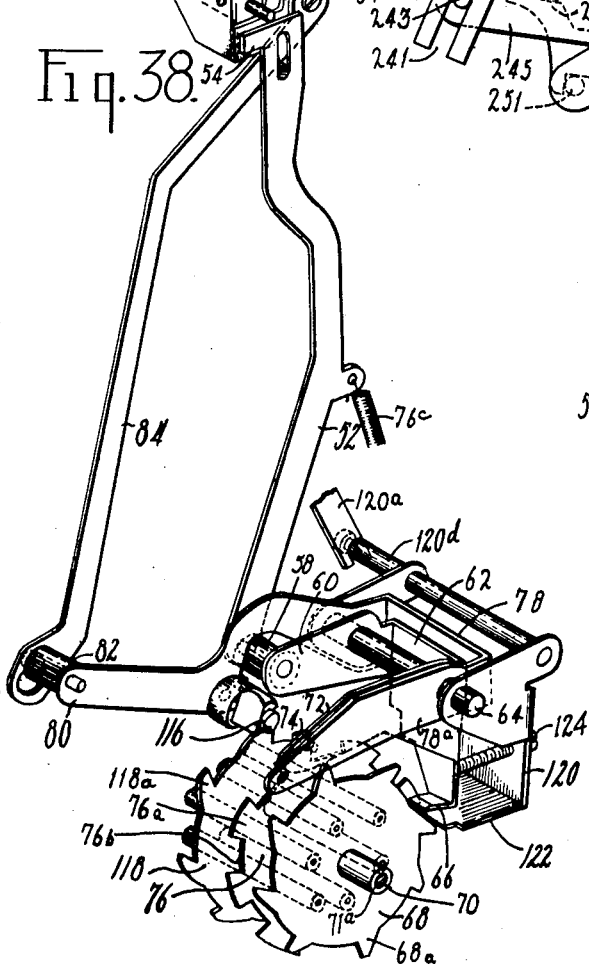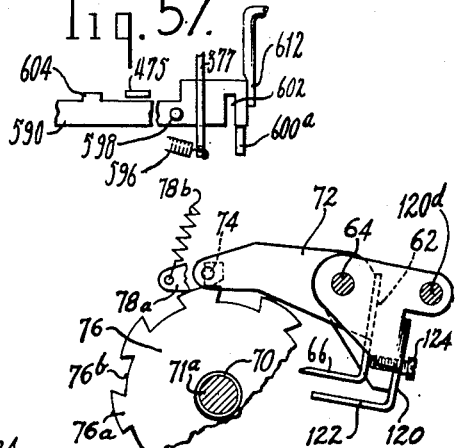

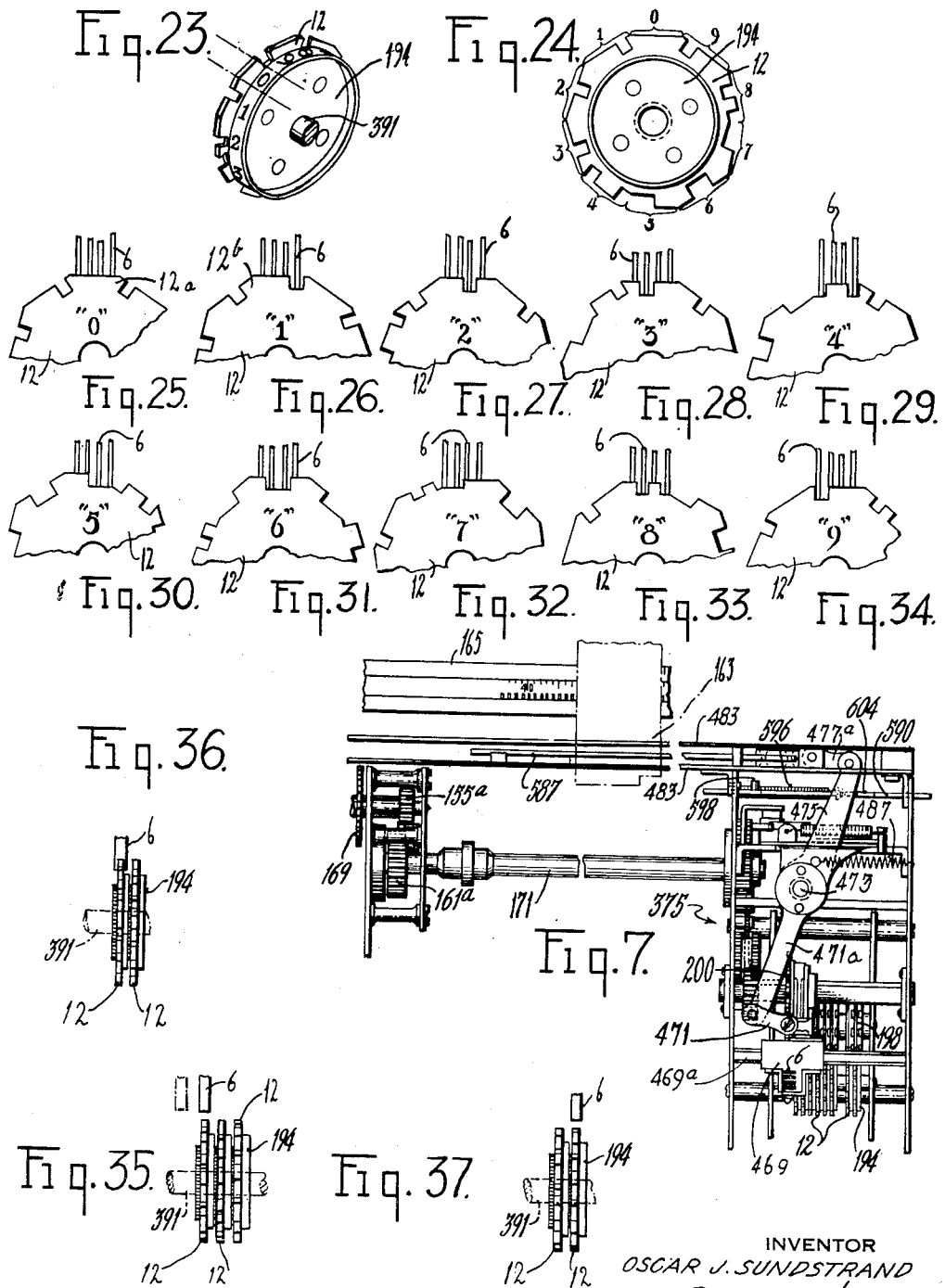

April 29, 1952     O. J. SUNDSTRAND     2,595,020
INTERLOCK BETWEEN CONTROL MEMBERS AND REGISTER
ANALYZING MECHANISM IN TYPEWRITER-COMPUTERS
Filed July 28, 1948     17 Sheets-Sheet 8

INVENTOR
OSCAR J. SUNDSTRAND
BY Jesse A. Holton
ATTORNEY

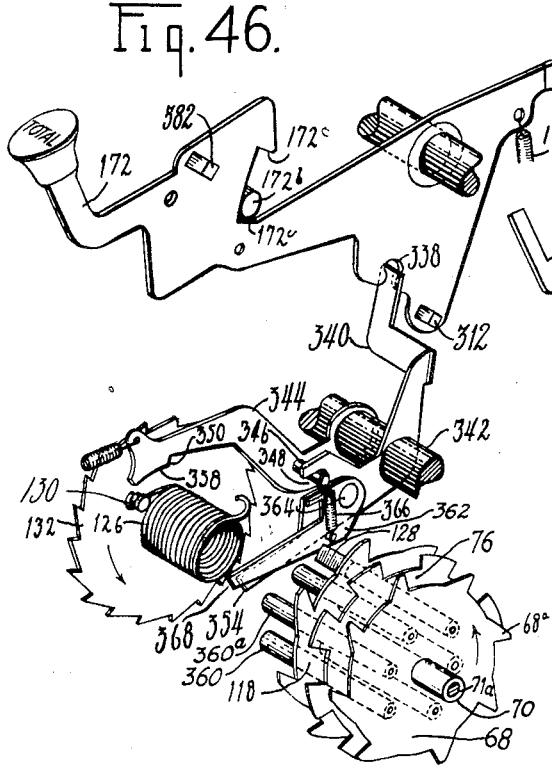
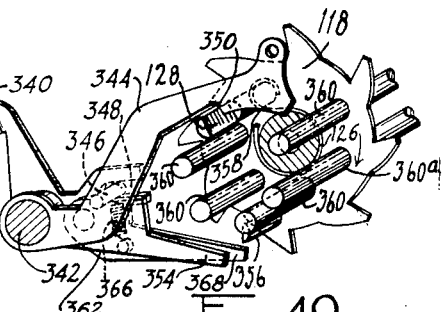
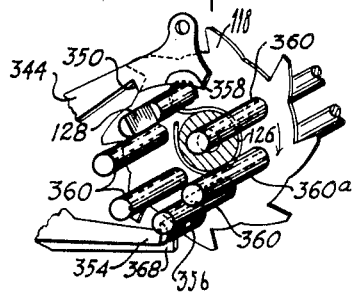
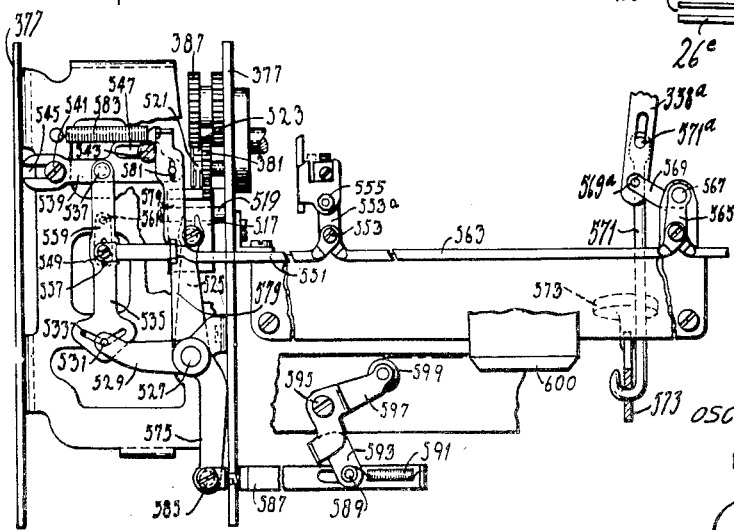

April 29, 1952  O. J. SUNDSTRAND  2,595,020
INTERLOCK BETWEEN CONTROL MEMBERS AND REGISTER
ANALYZING MECHANISM IN TYPEWRITER-COMPUTERS
Filed July 28, 1948  17 Sheets-Sheet 10
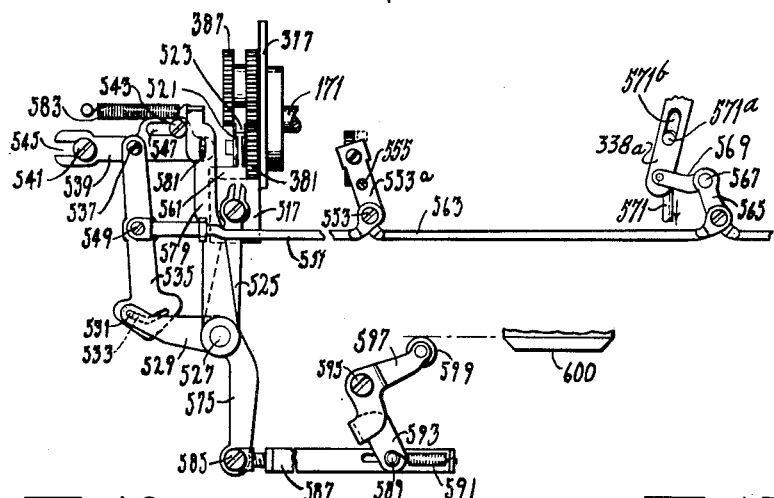
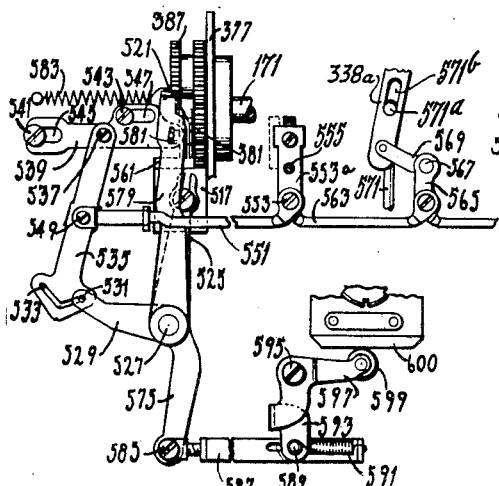
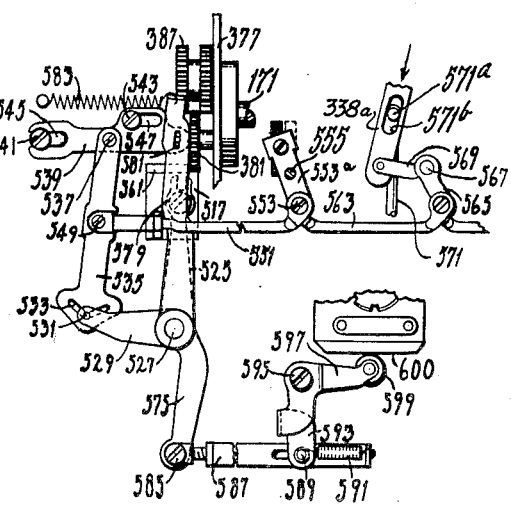
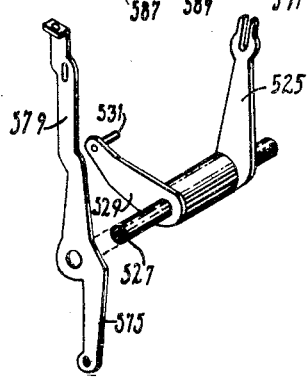
INVENTOR
OSCAR J. SUNDSTRAND
BY
Jesse A. Holton
ATTORNEY April 29, 1952  O. J. SUNDSTRAND  2,595,020
INTERLOCK BETWEEN CONTROL MEMBERS AND REGISTER
ANALYZING MECHANISM IN TYPEWRITER-COMPUTERS
Filed July 28, 1948  17 Sheets-Sheet 11
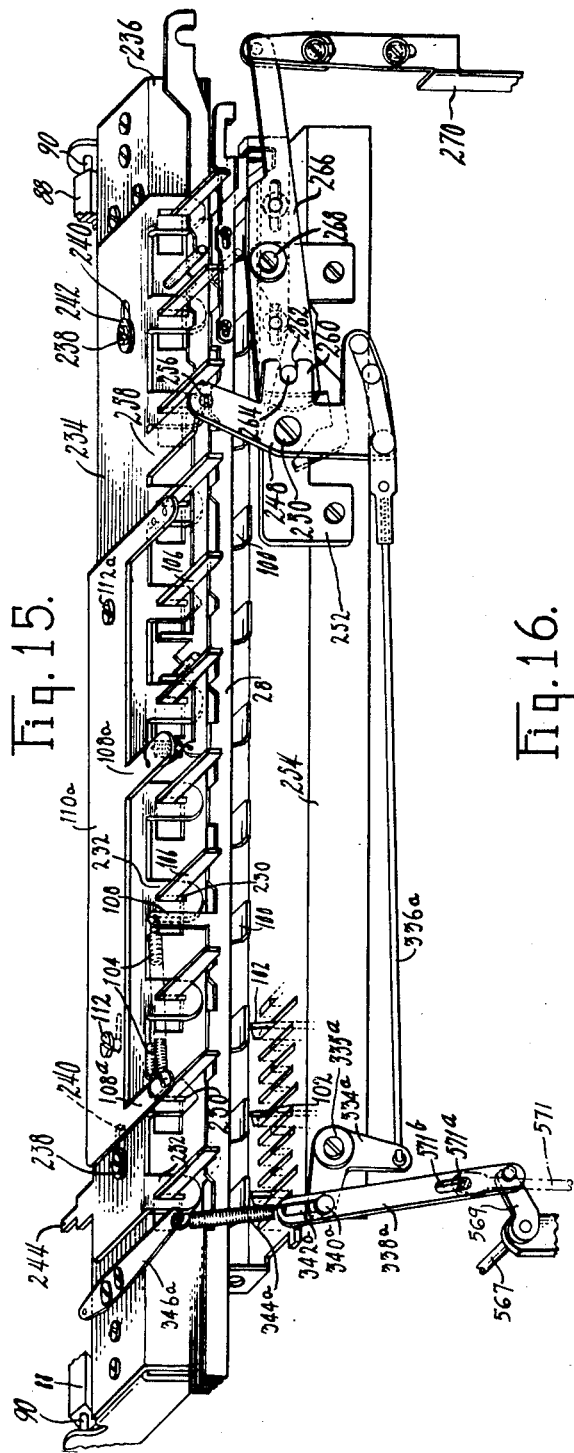
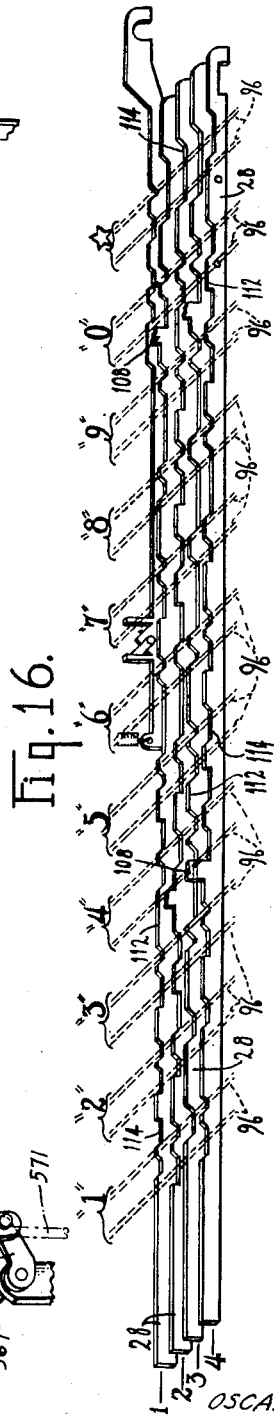
INVENTOR
*OSCAR J. SUNDSTRAND*
BY *Jesse A. Holton*
ATTORNEY

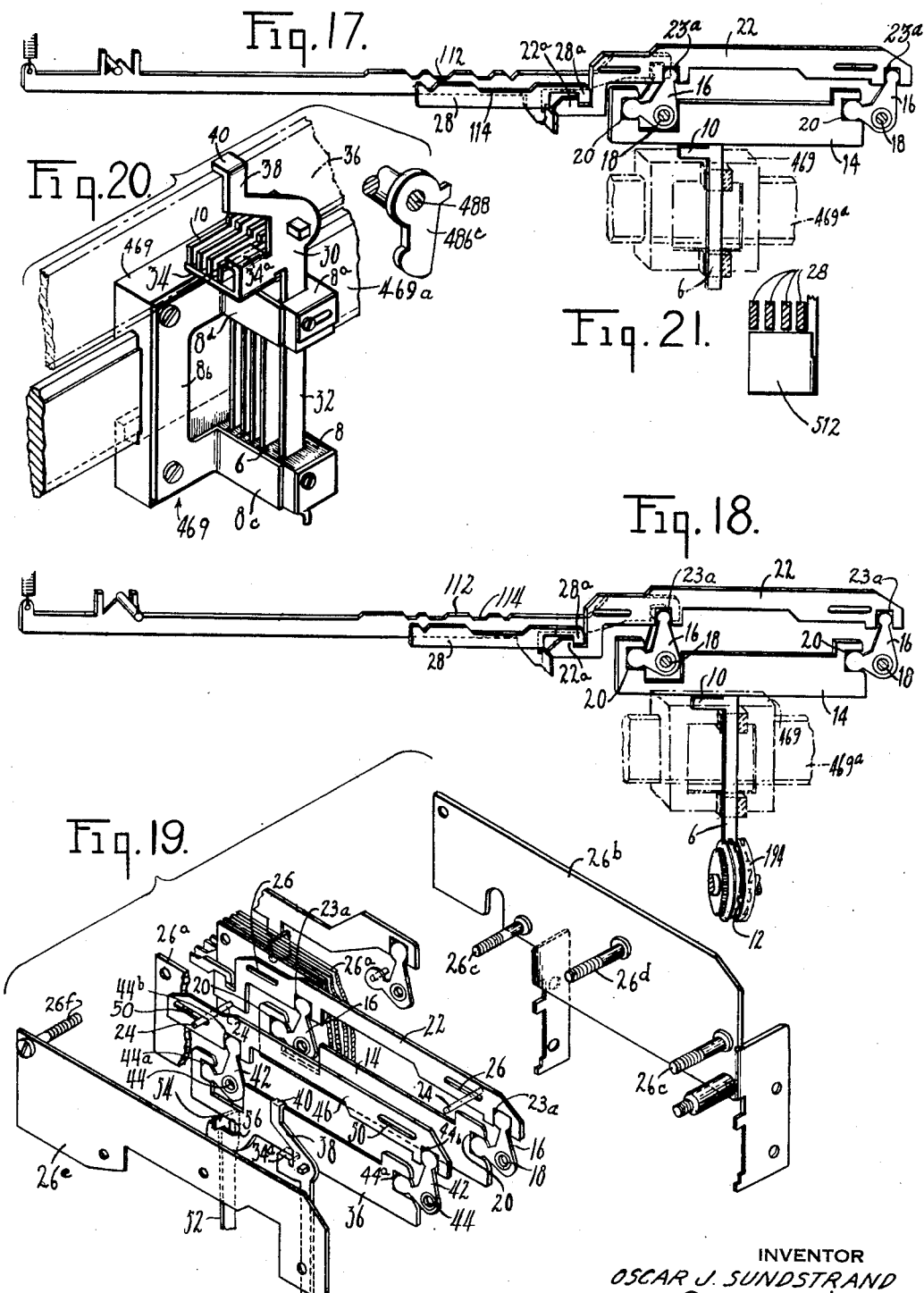

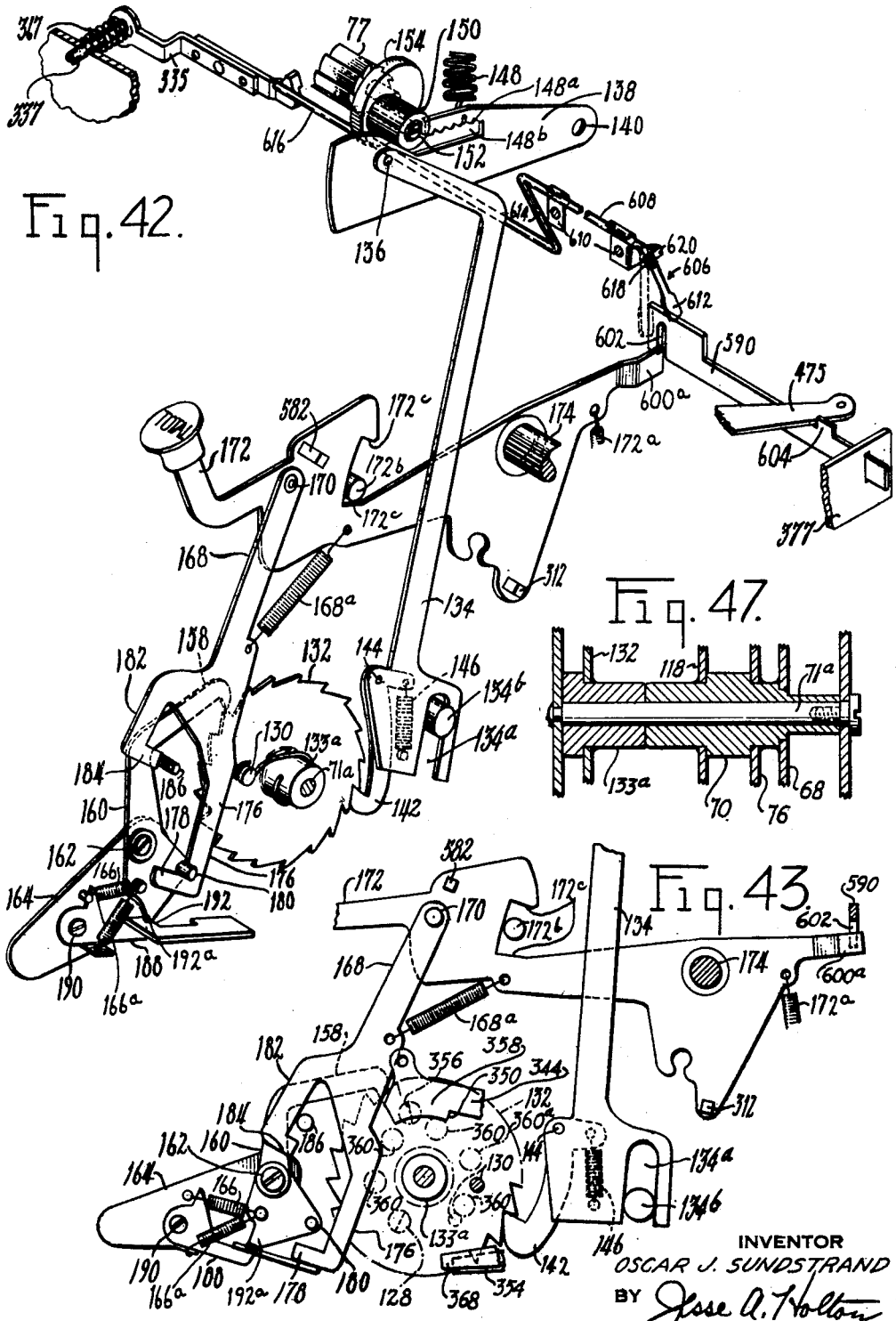

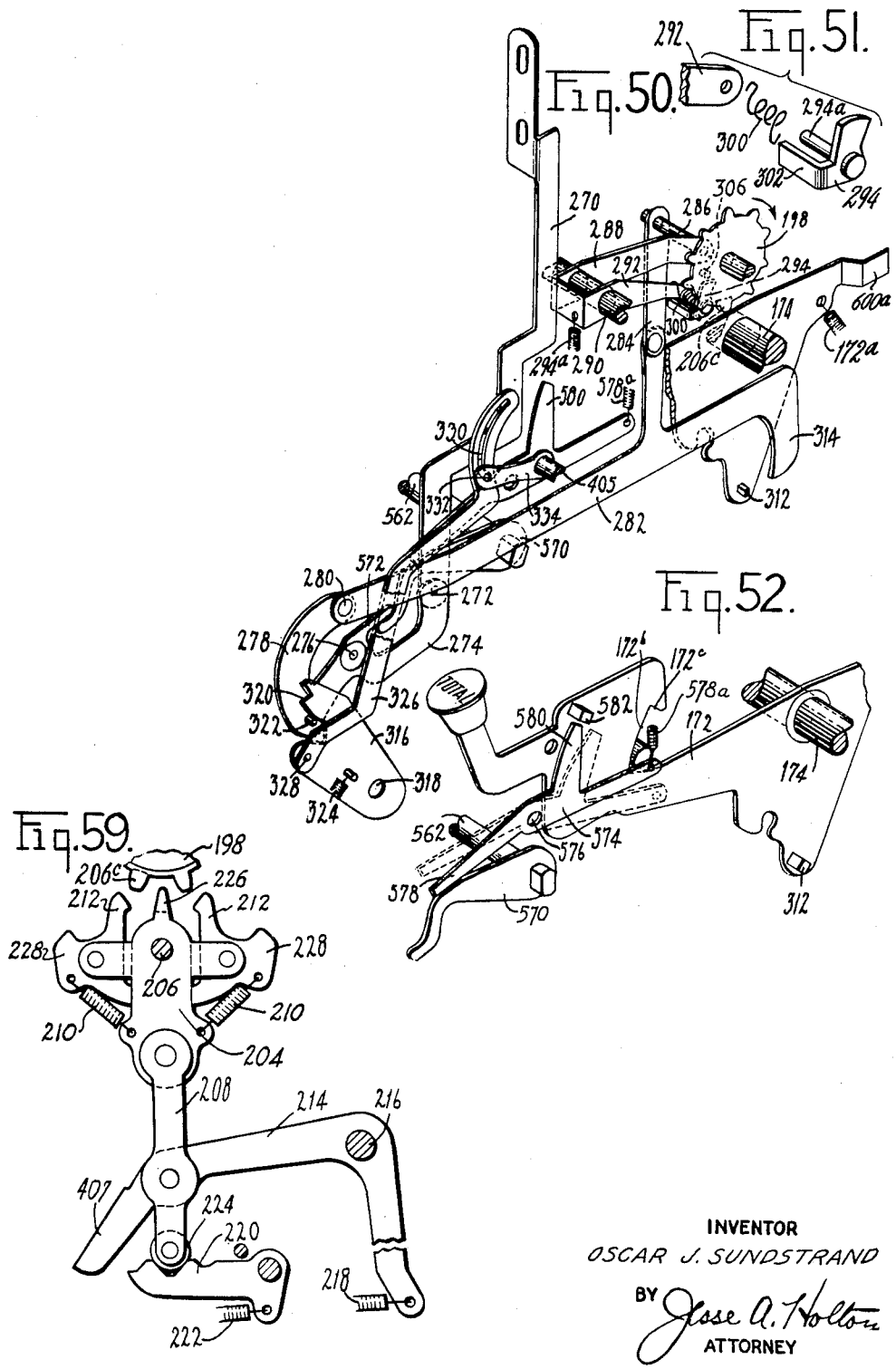

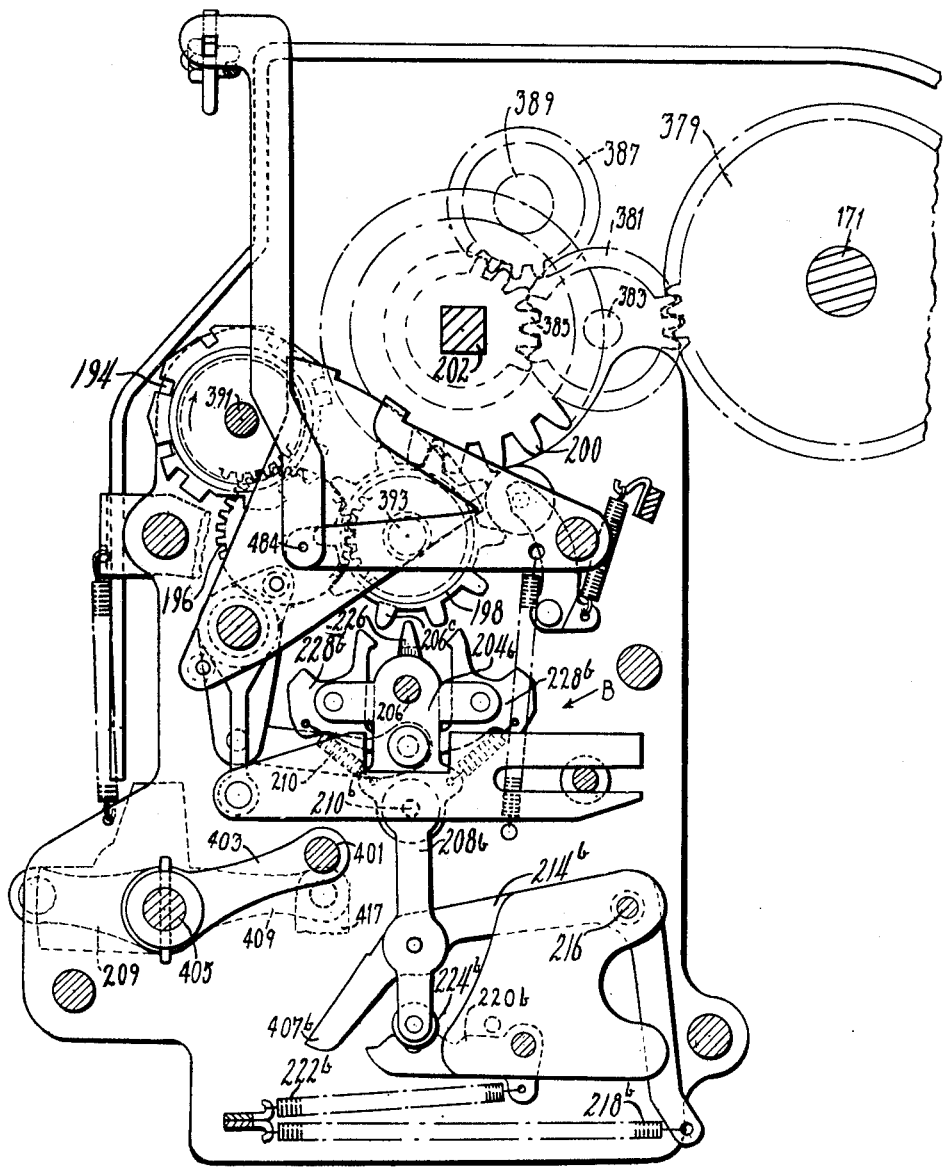

April 29, 1952   O. J. SUNDSTRAND   2,595,020
INTERLOCK BETWEEN CONTROL MEMBERS AND REGISTER
ANALYZING MECHANISM IN TYPEWRITER-COMPUTERS
Filed July 28, 1948   17 Sheets-Sheet 17

INVENTOR
OSCAR J. SUNDSTRAND
BY Jesse A. Holton
ATTORNEY

Patented Apr. 29, 1952

2,595,020

UNITED STATES PATENT OFFICE 2,595,020

INTERLOCK BETWEEN CONTROL MEMBERS AND REGISTER ANALYZING MECHANISM IN TYPEWRITER-COMPUTERS

Oscar J. Sundstrand, West Hartford, Conn., assignor to Underwood Corporation, New York, N. Y., a corporation of Delaware Original application September 4, 1944, Serial No. 552,656. Divided and this application July 28, 1948, Serial No. 41,065

2 Claims. (Cl. 235—130)

This invention relates to combined typewriting and accounting machines and more particularly to mechanism for automatically selecting the type bar mechanisms and actuating the same by power to print, digit by digit, a total entered in one of the registers of the machine.

The present machine is provided with an automatic total-taking mechanism which is set in operation by the actuation of manipulative means such as a total key. The total-taking mechanism comprises means for analyzing, denomination by denomination, the number wheels of the register and mechanism controlled by the analyzing mechanism for selecting the typewriting mechanisms in accordance with the numbers set up in the several denominations of the register. Normally, in taking a total, the master wheel of the number-entering mechanism is engaged with the number wheels of the several trains of the totalizer, denomination by denomination, and the digits of the total are subtracted in said denominations, to clear the totalizer. The analyzing mechanism and the register are relatively shiftable to shift said mechanism from denomination to denomination of the totalizer.

One object of the present invention is to provide machines of this type with mechanism for locking said manipulative means except when the analyzing mechanism is in registration with a predetermined denomination of the register.

Another object of the invention is to provide machines of the type or class referred to above with mechanism for locking said manipulative means except when the master wheel of the number-entering mechanism is in a predetermined denomination of the register.

The machine is provided with the usual manipulative device or key the depression of which shifts the driving mechanism to drive the totalizer of the register in a subtract direction. Another object of the invention is to provide machines of this character with mechanism for locking the manipulative means for setting the total-taking mechanism in operation when the manipulative subtract device is in subtract position.

The machine is also provided with a state-control device which is adjustable in positions to render the differential actuating mechanism for the register operative or inoperative when the actuating mechanism is in the zone of the register. Another object of the invention is to provide machines of this character with locking mechanism for locking the manipulative means for setting the total-taking mechanism in operation, with the state-control device adjusted to render the differential actuating mechanism inoperative when said mechanism is in the register zone.

With the above and other objects in view, the invention consists in a machine embodying the novel and improved features, constructions and combinations of parts hereinafter described and particularly pointed out in the claims, the advantages of which will be readily understood and appreciated by those skilled in the art.

This application constitutes a division of applicant's pending application Serial No. 552,656, filed September 4, 1944.

The various features of the invention will be clearly understood from the accompanying drawings illustrating a machine embodying the invention in its preferred form, and the following detailed description of the construction therein shown.

Figure 8:
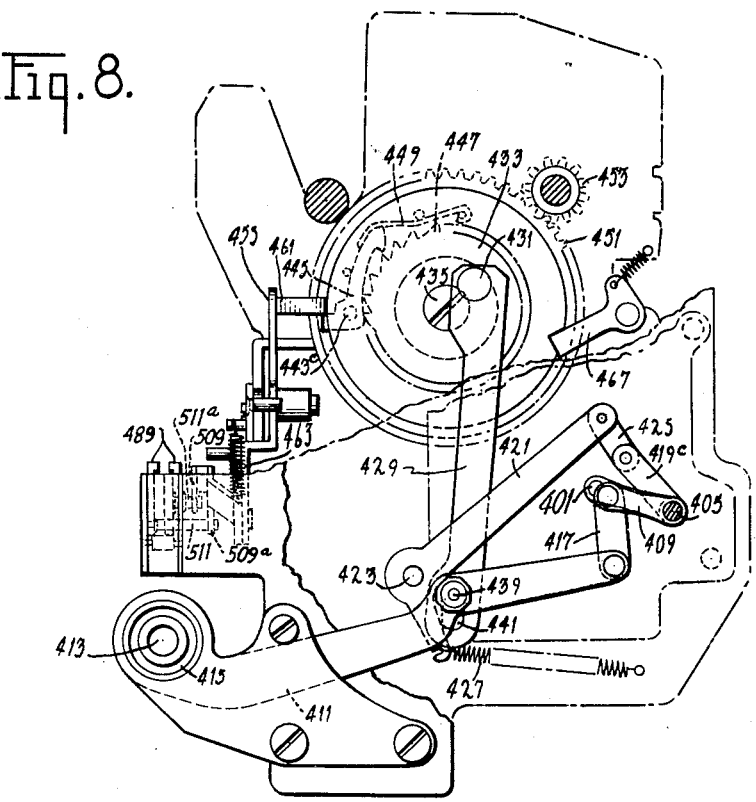
Figure 9:
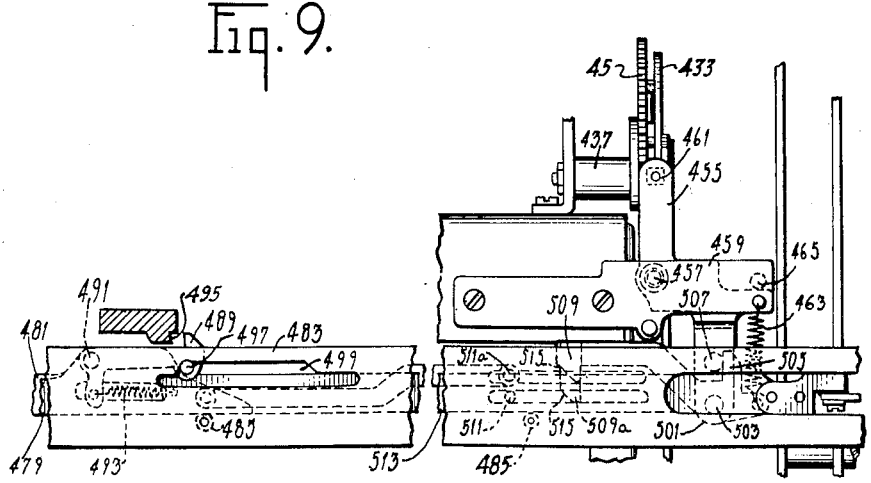

In the drawings:

Fig. 1 is a perspective view of a machine embodying the invention, showing the mechanism more directly concerned in the invention in full lines, and the remainder of the machine in dot-and-dash lines, Fig. 2 is a view in rear elevation illustrating particularly the type head or carriage of the machine, Fig. 3 is a view in vertical section of the machine illusrating particularly the type bar and differential actuator mechanisms, Fig. 3a is a detail view in side elevation illustrating the type shift mechanism for the numeral types, Fig. 3b is a view similar to Fig. 3 illustrating a portion of the mechanism shown in Fig. 3 on an enlarged scale, Fig. 4 is a detail plan view illustrating the mechanism for rendering the differential mechanism operative when the carriage is in the zone of a column register and the decimal space or trip mechanism, Fig. 5 is a view in side elevation illustrating particularly certain parts of the mechanisms shown in Fig. 4, and certain associated parts, Fig. 6 is a detail view in vertical section illustrating particularly the mechanism for rendering the differential mechanism operative when the carriage is in the zone of a register, Fig. 7 is a plan view of a portion of the machine and illustrating particularly one of the cross-computing register mechanisms, Fig. 8 is a detail view in side elevation illustrating particularly the transfer reset mechanism for one of the cross-computing registers, Fig. 9 is a rear elevation showing certain parts of the mechanism illustrated in Fig. 8 and certain associated parts, Fig. 10 is a view in rear elevation illustrating the driving means for one of the cross-computing registers and the mechanism for controlling the state of said driving means, as to addition or subtraction, from the subtract key and from an automatically acting subtract cam, Figs. 11, 12, and 13 are views similar to Fig. 10 and illustrating certain parts of the mechanism, respectively, in different positions in the several figures, Fig. 14 is a detail perspective view showing certain parts illustrated in Figs. 10–13, inclusive, Fig. 15 is a detail perspective view taken from the front of the type head and illustrating the mechanism for selectively controlling the actuation of the type bars from the total contained in one of the cross-computing registers and the mechanism for shifting certain of the parts, when the register moves from positive to negative condition, and from negative to positive condition, Fig. 16 is a detail perspective somewhat diagrammatic view illustrating certain longitudinally movable code bars for controlling the selective actuation of the type bars, detached from the machine, looking from the front thereof, Fig. 17 is a detail perspective view illustrating certain of the parts shown in Figs. 15 and 16 for selectively controlling the actuation of the type bars and an associated feeler mechanism, Fig. 18 is a view similar to Fig. 17 illustrating certain of the parts in different positions, Fig. 19 is an exploded view in perspective illustrating certain parts of the feeler mechanism for selectively controlling the actuation of the type bars, Fig. 20 is a detail perspective view illustrating particularly certain parts of said feeler mechanism, Fig. 21 is a detail view, partly in side elevation and partly in section, illustrating the code bars for controlling the selection of the type bar mechanisms, Fig. 22 is a detail plan view illustrating certain parts of the feeler mechanism, Fig. 23 is a detail perspective view illustrating one of the number wheels of the cross-computing register and an associated code disc, Fig. 24 is a view in side elevation illustrating the structure shown in Fig. 23, Figs. 25, 26, 27, 28, 29, 30, 31, 32, 33, and 34 are detail views in side elevation illustrating a code disc associated with one of the number wheels of the cross-computing register and the cooperating feelers, with said disc in positions, respectively, corresponding with the numbers from "0" to "9," inclusive, Fig. 35 is a detail view in front elevation illustrating certain of the number wheels of the cross-computing register, corresponding code discs, and one of the feelers for sensing the discs.

Fig. 36 is a view similar to Fig. 35 illustrating the feeler in a different position.

Figure 44:
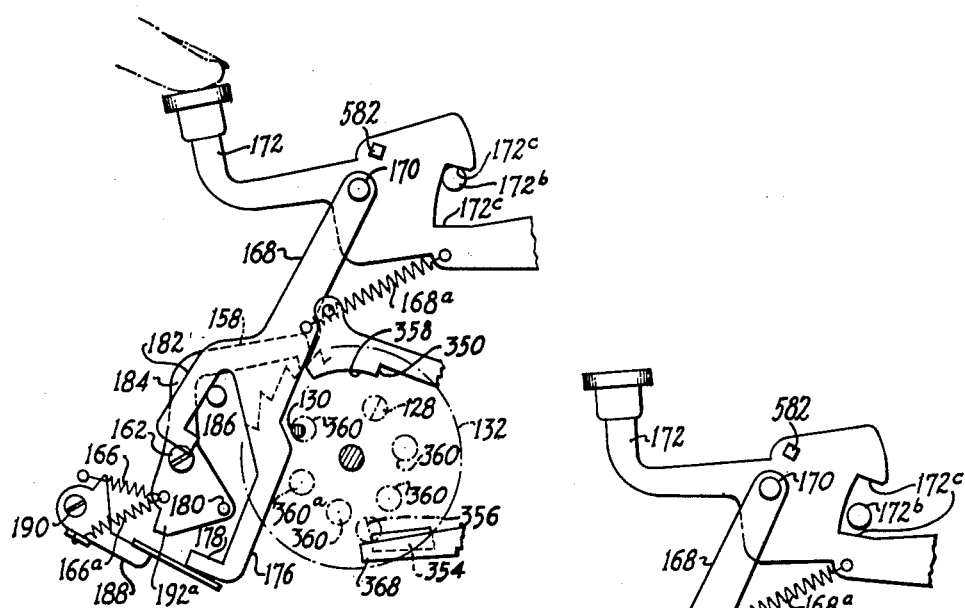
Figure 45:
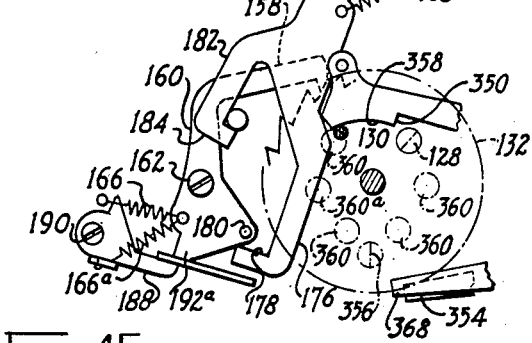
Figure 60:
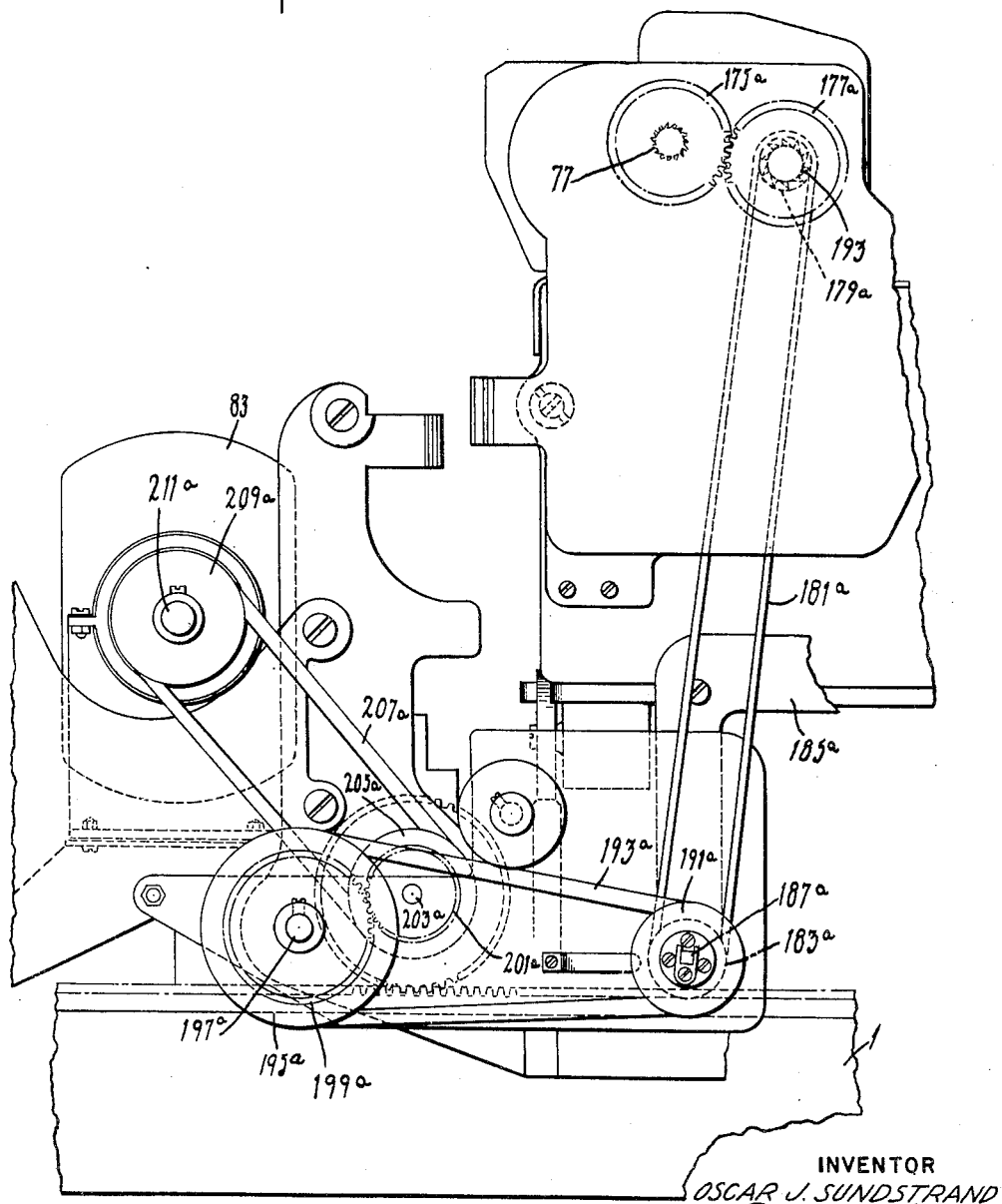

Fig. 37 is a view similar to Fig. 36 illustrating the feeler in a still different position, Fig. 38 is a perspective view illustrating the cycle cams, the mechanism for controlling the movement of said cams, certain parts of the mechanism for actuating the selector levers, and certain parts of the mechanism for actuating the feelers, Fig. 39 is a detail view in side elevation illustrating certain of the parts shown in Fig. 38, Fig. 40 is a detail exploded view in perspective, partly broken away, illustrating the selector levers and the mechanism for moving the same, Fig. 41 is a detail plan view illustrating a portion of the mechanism shown in Fig. 40, Fig. 42 is a perspective view illustrating the spring-winding mechanism for winding the spring for rotating the cycle cams, Fig. 43 is a view in side elevation illustrating certain of the parts shown in Fig. 42, Figs. 44 and 45 are views similar to Fig. 43 illustrating certain of the parts in different positions, Fig. 46 is a perspective, partially exploded view illustrating the mechanisms for rotating the cycle cams and for controlling the rotation thereof, Fig. 47 is a detail view in vertical section illustrating the construction for supporting the cycle cams, Fig. 48 is a detail perspective view illustrating a portion of the mechanism shown in Fig. 46 with certain of the parts in different positions, Fig. 49 is a view similar to Fig. 48 illustrating certain of the parts in still different positions, Fig. 50 is a detail perspective view illustrating the mechanism for shifting certain parts of the selecting mechanism when the cross-computing register is turned in a subtract direction to "0" and a lock mechanism for the total key, Fig. 51 is a detail exploded view in perspective illustrating certain of the parts shown in Fig. 50, Fig. 52 is a detail perspective view illustrating the total key and mechanism for locking said key shown in Fig. 50, Fig. 53 is a view in side elevation illustrating the right-hand cross-computing register, Fig. 54 is a detail view in rear elevation illustrating mechanism for locking the total key from depression except when the master wheel and feeler mechanism are in the highest denominational position of the cross-computing register from which the total is taken, Fig. 55 is a view similar to Fig. 54 illustrating a portion of the mechanism shown in Fig. 54 with certain of the parts in different positions, Fig. 56 is a view similar to Fig. 55 illustrating certain of the parts in still different positions, Fig. 57 is a view similar to Fig. 54 illustrating the greater portion of the mechanism shown in said figure and certain associated parts with certain of the parts in still different positions, Fig. 58 is a detail view in rear elevation illustrating the driving mechanism for the master wheel for operating the column registers, Fig. 59 is a detail view in side elevation illustrating the regular two-way transfer mechanism of the crossfooter, and Fig. 60 is a view in side elevation illustrating the driving mechanism for the machine.

The invention is illustrated and described in this application as applied to a combined typewriting and accounting machine of the Elliott Fisher type, the typewriting and accounting mechanisms of which have substantially the same construction, arrangement, and mode of operation of parts as the corresponding mechanisms in the machine illustrated and described in applicant's Patent No. 2,370,505, dated February 27, 1945. As shown and described in said patent, the type bar mechanisms and the differential actuating mechanisms are operated by power from a suitable motor.

In the illustrated construction, the machine comprises a platen frame, one of the side rails of which is indicated at 1, Fig. 3, a substantially flat platen 3 mounted for vertical movement in said frame, a line space frame, a portion of which is indicated at 5 mounted for forward and rearward movement on said platen frame and mechanisms for imparting a line-spacing movement to the line space frame at the end of each return movement of the carriage, all as shown and described in said patent.

Upon the line space frame is supported a type carriage or head indicated as a whole at 7 upon which is mounted the usual series of type bars each carrying one or more types for engaging the work sheets supported on the platen (see Fig. 1). The type bars are arranged to be operated by power driven mechanism in the present machine, and this mechanism, in part, is carried by the carriage. The carriage also carries the usual series of keys forming the keyboard of the machine and controlling the coaction of the type bars with the power driven mechanism. The carriage also carries a master wheel by which the totalizers or registers are driven and mechanism for driving the master wheel differentially by power to set up or enter successively the various digits of a number step by step in a register.

The type carriage is mounted for movement forwardly and rearwardly with the line space frame and is also mounted for lateral movement on said frame in a right-hand direction to letter space during a typing operation and for return movement in a left-hand direction to restore the carriage to position for starting the typing of a line (see Figs. 2 and 3). The carriage is provided with front and rear wheels or rollers arranged to engage, respectively, the front and rear rails of the line space frame of which the rollers engaging the rear rail 9 are indicated at 11. The carriage is acted upon by the usual metallic band 13 having one end attached to the carriage and connected with the usual spring drum 15 which tends yieldingly to move the carriage constantly in a right-hand direction along the rails of the line space frame, as shown in said patent. The letter-spacing movement of the carriage is controlled by the usual escapement mechanism, indicated as a whole at 17, this escapement mechanism preferably having substantially the same construction, arrangement and mode of operation of the parts as the escapement mechanism shown and described in the patent to Foothorap, No. 1,203,519, dated October 31, 1916.

*Type action*

(See Fig. 3.)

The present machine is provided with a series of type bars 19 each pivoted at 21 to a hanger 23 secured to the semicircular type bar ring 25 suspended below the deck 27 of the carriage. The type bars are, respectively, acted upon by coil springs 29 which operate to retract the bars and tend to retain them in their normal positions in engagement with a semicircular buffer ring 31.

The tail of each of the type bars is connected by a link 33 with an elbow lever 35 pivoted at 37 upon a hanger 39 depending from the deck 27. Each elbow lever is connected by a link 41 with the forward end of a sub-lever 43 pivoted at 45 upon a support 47 secured to the upper face of the deck 27. The rear end of the sub-lever 43 is connected by a link or push rod 49 with a horizontally arranged intermediate lever 51 pivoted on a fulcrum bar 53 extending across the rear of the key carriage. Each of the intermediate levers 51 is acted upon by a coil spring 55 which assists the retracting spring 29 in yieldingly holding the parts of the mechanism in the normal positions shown in Fig. 3.

*Power driven type bar actuating mechanism*

(See Figs. 3 and 3b)

In the present machine, power driven mechanism is provided for swinging the intermediate levers 51 in a downward direction about the fulcrum bar 53 to actuate the type bars. This mechanism comprises a longitudinally movable transmitting link 57 pivotally connected to the intermediate lever 51 by means of a stud 59. The transmitting link is pivoted at 61 to a radius arm or lever 63 which is journaled on a rod 65 extending longitudinally of the type carriage and supported on the cover plate 67. Said mechanism also comprises a longitudinally movable driving link 69, the lower end of which is pivoted at 71 to the radius arm 63. A pawl 73 is pivoted at 75 to the driving link and is provided with two teeth arranged to engage the teeth of a continuously rotating toothed or fluted shaft 77 mounted in bearings in the type carriage. The lower end of the driving link is acted upon by a coil spring 79 which tends to swing the link in a clockwise direction about the pivot 71 and to maintain normally the link substantially in the position shown in Fig. 3 with the pawl 73 in engagement with a fixed inclined arresting plate 81 extending across the type carriage, in which position the pawl is disengaged from the toothed shaft. In order to engage the pawl with the shaft, the driving link 69 is swung to the left (Figs. 3 and 3b) about the pivot 71. The shaft 77 is continuously driven by power through suitable driving connections from a motor 83, as shown and described in said Patent No. 2,370,505. Upon the engagement of the pawl with the shaft and the turning of the pawl 73 about the pivot 75 to its limiting position, the driving link 69 is driven in a downward direction to actuate the transmitting link 57 and the intermediate lever 51 downwardly.

The driving links are swung to the left to engage the respective pawls carried thereby with the toothed shaft by mechanism actuated by the keys of the keyboard. This mechanism comprises a drag link 85 connected at its left-hand end (Fig. 3) with an upwardly extending arm of the key lever 87 and having a shoulder 89, Fig. 3b, adjacent its right-hand end arranged to engage a pin 91 mounted on the driving link 69. The left-hand end of the drag link is connected with the upwardly extending arm of the key lever 87 by means of a stud 93 mounted on the link and engaging in a slot 95 in said arm of the key lever and a coil spring 97 which normally holds the stud 93 seated in the left-hand end of the slot. Each of the key levers 87 is pivoted on a shaft 97a common to the keys of all the banks and is provided with a forwardly extending arm on which is fixed a key 99. The end of the upwardly extending arm of each of the key levers extends through a guide slot 101 formed in a guide plate 103 secured to the upper portion of the frame of the type carriage and the movement of the key lever is limited by the engagement of said arm with the ends of the guide slot. Each of the key levers is acted upon by a coil spring 105 which normally maintains the upwardly extending arm thereof in engagement with the rear end of the guide slot.

With this construction, upon the depression of the key 99 of the key lever, the upwardly extending arm thereof will be swung forwardly or to the left (Fig. 3) to engage the pawl 73 with the toothed shaft 77.

When the key is depressed to actuate the key lever to swing the driving link to the left to engage the pawl with the toothed shaft, the movement of the driving link is limited by the engagement of the pawl with said shaft. As the driving link is carried downwardly by the rotary movement of the shaft, the link is swung to the left during the latter part of its movement by the engagement of the pawl contacting tooth of the shaft with the upper tooth of the pawl, the movement of said tooth of the shaft then having a substantial component toward the left (Fig. 3). In order to limit this swinging movement of the driving link and cause the disengagement of the pawl from the tooth of the shaft at the desired time in the actuation of the type bar mechanism, a series of stop plates 107 are adjustably mounted on the guide plate 103 and are arranged to be engaged, respectively, by the upper ends of the driving links to limit the swinging movement thereof.

The free rear ends of the drag links 85 project through guide slots 109 formed in the upper portion of the arresting plate 81. The bottom walls of these slots limit the downward movement of the drag links under the influence of the springs 97 as the driving links move downwardly to actuate the type bars.

The trailing ends of the driving links 69 travel up and down and move forwardly and rearwardly in guide slots 111 formed in a transverse bar 113 supported on the frame of the type carriage.

*Interlock for driving links*

(See Fig. 3)

An interlock mechanism is provided for preventing more than one of the driving links from being swung forwardly into operating position at the same time. This mechanism comprises a series of interlocking balls 109a confined in a channel 111a formed in the bar 113, as shown and described in said Patent No. 2,370,505.

*Escapement mechanism*

(See Fig. 2.)

The present machine, as stated above, is provided with an escapement mechanism for controlling the letter-spacing movement of the type carriage having substantially the same construction, arrangement, and mode of operation of parts as the corresponding mechanism illustrated and described in the patent to Foothorap, No. 1,203,519. This escapement mechanism comprises a carriage feed rack 115 (see Fig. 3) secured to the rear rail 9 of the line space frame and a feed pinion 117 journaled on a shaft 119 having its ends engaged in suitable supports on the frame of the type carriage. To this pinion is secured an escapement wheel 121 controlled by escapement dogs 123 and 125 arranged to engage said wheel and operated from the universal bar by means of the usual draw wire 127. The holding dog 123 is pivoted at 129 on the bracket 131 suspended from the deck 27, the spacing dog 125 is pivoted at 133 on said bracket and said dogs are connected by a link 135 and by an operating spring 137, as fully shown and described in said patent. The draw wire 127 is connected at its upper end with an arm 139 (see Fig. 3) secured to a rock shaft 141 arranged transversely of the type carriage. Arms 143 are secured to this rock shaft from which is suspended a universal bar 145. This bar extends beneath the several intermediate levers 51 and is arranged to be engaged by an abutment screw 147 mounted in each of said levers. The depression of the universal bar 145 by the downward movement of any one of the intermediate levers 51 swings the rock shaft 141 in a counterclockwise direction (Fig. 3) thereby swinging upwardly the arm 139 to swing the holding dog 123 out of operative position and to swing the spacing dog 125 into operative position. The rock shaft is acted upon by a return spring 149 connected with an arm 151 fixed to the shaft which acts to turn the rock shaft back in a clockwise direction upon the release of the universal bar 145 by the intermediate lever 51. This movement of the rock shaft swings the arm 139 back downwardly and releases the draw wire 127 and the spacing dog 125 is swung out of operative position and the holding dog 123 is swung back into operative position by the spring 137. An arm on the spacing dog 125 engages a pin 153 mounted in a fixed arm 155 extending from a bracket constituting one of the supports for the escapement mechanism, said pin being engaged by an arm on the dog to limit the movement of the dog.

The escapement mechanism is controlled from the space bar by mechanism having substantially the same construction, arrangement and mode of operation of parts as the corresponding mechanism illustrated and described in applicant's Patent No. 2,239,023. This mechanism comprises devices operated by power for swinging the rock shaft 141 in a counterclockwise direction (Fig. 3) to throw out the holding dog 123 and to throw in the spacing dog 125, and the parts are restored to their normal positions by the action of the restoring springs 137 and 149.

*Register and differential actuator mechanisms*

(See Figs. 3, 3b, 4 and 6.)

The machine illustrated is provided with a series of registers 163 mounted at the rear of the machine upon a register bar 165 fixed to the line space frame, said registers being provided with totalizer wheels 167, 167a and 167b. The type carriage is provided with power driven mechanism for actuating the totalizer wheels of the column registers to set up numbers in said wheels. This mechanism is controlled by the numeral keys of the typewriter keyboard. This mechanism comprises a master wheel 169 (Fig. 3) located at about the middle of the type carriage at the rear thereof and extending rearwardly from the carriage into position to engage the lowest set of wheels of the totalizer mechanism. The master wheel is fixed to a shaft journaled in the carriage and is connected by suitable gearing with the main differential actuator shaft 171 extending across the type carriage and journaled in suitable bearings 167c supported on the frame of the carriage.

The shaft 171 is rotated differentially to impart differential movements to the master wheel 169 and to the totalizer wheels of a register to enter the desired numbers in the register by differential mechanisms selectively controlled from the several numeral keys of the type bar mechanisms. These differential mechanisms are selectively thrown into operation by the corresponding numeral type bar actuating mechanisms, respectively. The said differential mechanisms have substantially the same construction, arrangement and mode of operation as the corresponding mechanisms shown and described in applicant's Patent No. 2,370,505. The several mechanisms for differentially rotating the shaft 171 under control of the numeral keys from "3" to "9," inclusive, to enter corresponding numbers in the register, all have the same general construction, arrangement and mode of operation of parts, these mechanisms differing only in the respects hereinafter pointed out to vary the rotative movement imparted to the shaft.

Each of these mechanisms (see Figs. 3 and 3b) comprises a longitudinally movable rack bar 173, pivotally suspended at 175 on an arm 177 which is pivoted on a shaft 179 extending across the type carriage. These arms are acted upon by a bail 181 also pivoted on said shaft and normally held yieldingly in depressed position by a spring 183, the bail engaging the upper sides of the arms, as shown in Fig. 3. The downward movement of the bail is adjustably limited by an adjustable stop lever 185, such as shown in application Serial No. 552,656.

Each of the racks 173 is provided, on the rear side thereof, with a series of downwardly inclined teeth arranged to engage the teeth of a gear 187, fixed to the shaft 171, the teeth of a gear 187 being inclined in a clockwise direction, Figs. 3 and 3b. The shaft 171 is connected with the master wheel 169 to drive the same by suitable gearing hereinafter described. Each of the rack bars is also provided on its forward side with a series of downwardly inclined teeth arranged to engage the teeth of a continuously rotating power driven toothed or fluted shaft 193 extending across the type carriage and journaled in bearings carried by the side plates 195.

Each of the rack bars is normally held in a position intermediate between the shaft 193 and the corresponding gear 187, as shown in Fig. 3, in which it is disengaged from both shaft and gear. The mechanism for holding each rack in this position comprises a pin 197 secured in the bar adjacent the lower end thereof and engaging in a recess in a lever 199 pivoted at 201 on an upright supporting plate or bracket 203 secured to the cover plate 67. This lever is acted upon by a coil spring 207 which tends to swing the lever upwardly and yieldingly holds the pin engaged in the recess with the pin in contact or substantially in contact with the lower edge of a fixed cam plate 209 attached to the upright plate 203.

In order to throw into operation the differential mechanism for entering a given digit in the totalizer wheels of a register, the rack bar 173 corresponding to this digit is swung forwardly to engage the teeth on the forward side of the rack bar with the teeth of the continuously rotating shaft 193. By the engagement of the rack bar with the shaft, the rack bar is moved longitudinally upward and the corresponding arm 177 and the bail 181 are swung upwardly by the movement of the rack bar against the action of the spring 183. When the rack bar has been moved upward the distance required for the subsequent action thereof, it is swung rearwardly to disengage the teeth on the forward side thereof from the shaft 193, this movement being limited to prevent the engagement of the teeth on the rear side thereof at this time with the gear 187. The rack bar is then moved longitudinally downward by the action of the bail 181 to a constant position, which is substantially the same for all of the several bars. At a predetermined point in the downward movement of the rack bar, the bar is swung farther to the rear to engage the teeth on the rear side of the bar with the gear 187, and, during the continued downward movement of the bar, the gear is rotated to actuate the totalizer wheels to enter the corresponding digit in the register.

The several mechanisms for swinging the rack bars forwardly to engage said bars selectively with the continuously rotating shaft 193 are operated from the several corresponding intermediate levers 51 connected with the numeral type bars as these levers are moved downward, respectively, to actuate the type bars corresponding to the numeral keys. These mechanisms, however, are rendered operative only when the master wheel 169 is in position to engage and actuate one of the wheels of the totalizer mechanism of a register. The position of the type carriage when the master wheel is in position to operate the totalizer wheels of a register will be, in certain instances, hereinafter referred to as the position of the carriage when in the zone of a register.

The mechanism for swinging each of the rack bars forwardly comprises a lever 211 (one for each rack bar) pivotally suspended at 213 upon an arm 215 secured to a rock shaft 217 extending across the type carriage and supported in bearings in the end plates thereof. The lever 211 projects at its lower end through a guide slot in the cover plate 67 and is formed on its left-hand side with a projection 221 arranged to engage the pin 197. The rock shaft 217 is acted upon by a coil spring attached to an arm on said shaft (not shown) which normally maintains the arm 215 and the lever 211 in lowered position with the projection 221 below the pin 197. The lever 211 is connected by a link 223 with a plate fixed to the upper end of an arm 225 secured to one of the intermediate levers 51.

The levers 211, when the carriage is not in the zone of a register, occupy their lowered positions, as shown in Fig. 3. The machine is provided with the usual state-control device and register engaging cam mechanism for controlling the action of the totalizer wheels of a register from the differential mechanism when in the zone of a register, both of which are shown and described in applicant's Patent No. 2,370,505. With the state-control device adjusted in "write" or "total" positions, the levers 211 will occupy their normal lowered positions when the carriage is in the zone of a register. With the state-control device adjusted in "compute" position, when the carriage is in the zone of a register, the levers 211 assume elevated positions to locate the projections 221 opposite the pins 197.

With this construction, when the lever 51 of a numeral type bar mechanism is swung downwardly to actuate the type bar, the corresponding lever 211 is swung forwardly through its connection with the arm 225. If the lever 211 is, at this time, in lowered position, the projection 221 thereon will not engage the pin 197, and this movement of the lever 211 will not affect the position of the rack bar. However, if the lever 211 is then in elevated position, the projection 221 on the lever will engage the pin 197 on the rack bar, as said lever is swung forwardly, and the rack bar will be swung forwardly therewith to engage the same with the continuously rotating shaft 193.

When the rack bar is engaged with the shaft 193, the bar is moved upwardly by the action of the shaft for the distance required for its subsequent action and is then swung rearwardly to disengage the same from the shaft by means of a pin 227 projecting downwardly from a supporting plate 229 secured to the frame of the carriage, which pin engages a laterally projecting arm 231 on the rack bar.

During the lateral swinging movement of the rack bar forwardly to engage the same with the shaft 193, the pin 197 travels along the lower edge of the fixed cam plate 209 and then passes beyond said edge to locate the same forwardly of the plate. The upward movement of the rack bar produced by its engagement with the shaft 193 then carries the pin in front of the cam plate. During the upward movement of the rack bar, the pin travels along the forward edge of the cam plate which is shaped, as shown in Fig. 3, and tends to guide the lower end of the rack bar and prevent it from disengaging the continuously rotating shaft. As the rack bar approaches the upper end of its movement, the upward movement of the rack carries the pin 197 beyond the upper end of the cam plate so that the pin leaves the forward edge of the cam plate and the rack bar is free to swing rearwardly. As the rack bar is swung rearwardly by the action of the pin 227, the pin 197 engages the forward side of a fixed guide plate 233 (see Figure 3b) secured to the upright supporting plate 203 above the cam plate 209 and arranged to leave a crossover or channel 235 between the lower edge of the same and the upper edge of said cam plate. This plate 233 limits the rearward movement of the rack bar to prevent, at that time in the cycle, the engagement of the rack with the gear 187, and forms a guide for the lower end thereof during the first part of the downward movement of the bar.

During the first part of the downward movement of the rack bar, under the action of the bail 181, the pin 197 moves along the forward side of the guide plate 233 until it reaches the channel 235, the rack bar then being disengaged from the gear 187. As the pin reaches the channel, which occurs at a predetermined point in the downward movement of the rack bar, said pin is directed into said channel by the cam plate 209 which projects to the left some distance beyond the guide plate 233, as shown in Fig. 3. The channel 235 is inclined downwardly and to the right (Fig. 3) and, during the passage of the pin 197 through the same, the rack bar is swung rearwardly by the action of the cam plate 209, thereby engaging the rack bar with the gear 187 at a predetermined point in the downward movement of the rack bar.

During the continued downward movement of the bar under the action of the bail 181, the gear 187 is actuated to accumulate the number, corresponding to the numeral key depressed, in the number wheels of the totalizer mechanism of the column register. After the rack bar 173 is engaged with the gear 187, and the rack bar continues its downward movement, the pin 197 engages the rear edge of the cam plate 209 which forms a guide for the rack and, at substantially the end of the downward movement of the rack, the pin engages the projecting end of the lever 199. By the engagement of the pin with the lever, the lever is swung downwardly slightly and the pin is deflected forwardly into the recess in the lever by the contacting edge of the lever which is inclined to a slight degree to the direction of downward movement of the pin, thereby again locating the rack bar in its intermediate position.

The cam plate 209 and the guide plate 233 differ in size and contour for each of the several actuator racks. The position of the channel 235 or the position of the upper inclined edge of the cam plate 209 determines the point in the downward movement of the rack bar at which the rack bar is engaged with the gear 187 to actuate the totalizer wheels of a register and this determines the extent of actuation of said wheels and the number which is entered therein.

The differential mechanisms for actuating the gears 187, corresponding to the actuator racks controlled by the numeral keys for the numbers "1" and "2," differ in certain respects from the corresponding mechanisms for actuating corresponding gears 187 under control of the numeral keys for the numbers from "3" to "9," inclusive. These differential mechanisms for actuating the gears 187 to enter the numbers "1" and "2" have substantially the same construction, arrangement and mode of operation as the corresponding mechanisms illustrated and described in said Patent No. 2,370,505. In each of these latter mechanisms, each rack 173 is disengaged from the fluted shaft 193 at a predetermined point in the upward movement of the rack, differing in the case of each rack, the rack is immediately engaged with the corresponding gear 187 and the gear is actuated at the beginning of the downward movement of the rack. Thus, the differential movement of the respective racks is produced by disengaging the racks from the fluted shaft 193 and engaging the same with the corresponding gear 187, with the racks in differential positions. In this case also, the upward movement of the racks is produced by the rotation of the fluted shaft 193, and the downward movement is produced by the downward movement of the bail under the influence of the bail actuating spring, as in the case of the racks for entering the numbers from "3" to "9," inclusive.

The master wheel 169 is located at about the middle of the type carriage at the rear thereof and extends rearwardly from the carriage into position to engage the gears 167 of the totalizer mechanisms of the column registers. The master wheel is fixed to a short shaft 149a (see Figs. 2 and 58) journaled in bearings in brackets 151a and 153a secured to the type carriage. To the shaft is fixed a pinion 155a which is constantly in mesh with a gear 157a fixed to a shaft 159a mounted for rotative and axial sliding movements in the brackets 151a and 153a. When the mechanism is set for addition, this gear also meshes with a gear 161a attached to the main differential actuator shaft 171 extending across the type carriage and journaled in bearings 167c supported on the frame of the carriage. The gear 157a, when the machine is set for subtraction, is demeshed from the gear 161a and meshes with a gear section 169a of a twin gear 169a, 171a journaled on a shaft 173a supported in the brackets 153a. The other section 171a of said twin gear is constantly in mesh with the gear 161a and, when the machine is set for addition, the twin gear rotates idly.

The mechanism for driving continuously the fluted shafts 77 and 193 (see Fig. 60) comprises a gear 175a fixed to the shaft 77 and a gear 177a fixed to the shaft 193 and meshing with the gear 175a. To the fluted shaft 193 is attached a pulley 179a connected by a belt 181a with a pulley 183a journaled on a hollow bearing secured to a bracket 185a attached to the frame of the carriage. This pulley is provided with a square opening in which fits a square shaft 187a having bearings at its ends on the line space frame, one of which is indicated at 189a in Fig. 3, the pulley being slidable longitudinally of the shaft. Upon the shaft 187a is secured a pulley 191a connected by a belt 193a with a pulley 195a fixed to a shaft 197a mounted in bearings on the line space frame. To the shaft 197a is attached a gear 199a meshing with a gear 201a journaled on a shaft 203a secured at its ends to the line space frame. To the gear 201a is attached a pulley 205a connected by a belt 207a with a pulley 209a fixed to the shaft 211a of the motor 83.

The driving connections above described between the motor 83 and the fluted shaft 77 have substantially the same construction, arrangement and mode of operation as the driving connections between the motor and the corresponding fluted shaft shown and described in applicant's Patent No. 2,370,505, except that, in the present construction, there is no provision for driving the square shaft 187a at variable speeds from the shaft 197a. The sliding connection between the pulley 183a and the square shaft 187a maintains a driving connection between these parts while allowing the letter-spacing and return movements of the carriage.

*Means for enabling differential mechanism*

(See Figs. 2 and 6)

The mechanism for raising the levers 211 into operative position with relation to the pins 197 comprises one of the arms 215 secured to the rock shaft 217 and a link 237 pivotally suspended at 239 upon said arm. The link 237 extends through a suitable slot in the cover plate 67 and is formed at its lower end with a slot 241 in which engages a pin 243 secured in the left-hand end, Fig. 6, of a lever 245 pivoted at 247 upon a bracket depending from the cover plate. The vertical position of the lever 245 is controlled by means of a lever 249 also pivoted at 247 on said bracket and carrying a pin 251 which engages the underside of an interposer 253 intermediate between the lever 249 and the lever 245. The interposer 253 is pivoted at 255 to an arm 257 fixed to a rock shaft 259 supported in suitable bearings upon the underside of the cover plate 67 and is formed with a shoulder 261 upon which rests, under certain conditions, a pin 263 secured in the lever 245. Thus the interposer is supported by the lever 249 and the arm 257 and the position of the interposer longitudinally of the lever 245 is determined by the position of the arm 257 and the rock shaft 259.

The angular position of the lever 249 is controlled by the usual register engaging cam lever. This cam lever and the construction through which it is connected to the lever 249 is similar to the corresponding construction illustrated and described in the patent to Foothorap, No. 1,512,282, dated October 21, 1924. The right-hand end, Fig. 6, of the lever 249 engages in a slot 265 in a vertically movable plate or slide 267 located on the inside of the cover plate which is connected by a pin 269 with a lever 271 located on the outside of the cover plate (see Figs. 2 and 6) the pin 269 moving in a slot in the cover plate. The lever 271 is pivoted upon a stud 273 secured in a downturned portion of the cover plate and is connected by a coil spring 275 with the cam lever 279. The cam lever is also pivoted upon the stud 273 and is provided with the usual cam 281 which is engaged and depressed to depress the cam lever by a cam surface formed on the left side of a plate 283 (Fig. 3) secured to the base of the register upon the movement of the carriage into the zone of a register. The cam lever, in its downward movement, swings the lever 271 downwardly therewith by the engagement of an arm 285 (see Fig. 2) formed on the cam lever with an eccentric stop 287 secured to the lever 271. Thus, through the connections described, when the register engaging cam is depressed by the locating of the type carriage in the zone of a register, the right-hand end of the lever 249 (Fig. 7) is also depressed. The position of the rock shaft 259 is controlled by a manually settable element for determining the condition of the machine. When the rock shaft is at this time positioned to locate the interposer 253 in the position shown in Fig. 6, the link 237 and the arm 215 will be elevated by the action of the register engaging cam lever to raise the levers 211 into operative position. When the rock shaft 259 is positioned to locate the interposer 253 in a position to the left of that shown in Fig. 6, the shoulder 261 on the interposer does not lie beneath the pin 263, and the arm 215 and link 237 will not be elevated by the movement of the lever 249.

The rock shaft 259 and arm 257 are located in the position shown in Fig. 6 to condition the machine for the operation of the totalizer actuating mechanism, or to enable said mechanism. The rock shaft and arm are swung to the left from the position shown in Fig. 7 to condition the machine to disable the totalizer actuating mechanism. The mechanism for positioning the rock shaft comprises a second arm 289 (see Fig. 5) extending downwardly from said shaft and carrying a pin 291 projecting laterally therefrom and engaging in a slot 293 in a lever 295 pivoted at 297 on the side plate 299 of the carriage casing. This lever is acted upon by a coil spring 301 which tends constantly to swing said lever to the right and to maintain the arm 289 in the position shown in Fig. 5. A second lever 303 is also pivoted at 297 on said side plate and is connected with the lever 295 by means of a pin 305 secured to the lever 295 and engaging in a slot 307 formed in the lever 303. The lever 303 is pivotally connected at its upper end to a longitudinally movable link 309 which is supported by said lever and by a stud 311 secured in the side plate of the carriage and engaging in a longitudinal slot 313 in the link. The longitudinal position of the link is controlled by means of a manually operable setting lever 315 pivoted on a stud 317 secured in the upright plate 195 at one end of the carriage and having a slot 321 at its lower end in which engages a pin 323 secured in the link 309. The lever 315 is provided with an arm 325 extending forwardly beyond the frame of the carriage by which the lever may be manually adjusted. The lever is arranged to be adjusted in three different positions to control the condition of the machine, and a detent lever 327 is pivoted at 329 on the plate 319 and is acted upon by a coil spring 331 which tends to swing the lever to engage the projection at the forward end thereof with any one of the three notches 333 to hold the lever in any one of the three positions in which it may be adjusted.

Decimal space mechanism

The decimal space mechanism of the machine is similar to the corresponding mechanism illustrated and described in Patent No. 1,512,282 referred to above, many of the parts having substantially the same construction, arrangement and mode of operation. This mechanism comprises a trip lever 335 (see Figs. 4 and 5) secured to the rear end of a longitudinally movable rock shaft 337 to the forward end of which is attached an arm 339 pivotally connected to the upper end of a rod or wire 341. The lower end of this wire is pivotally connected to a lever 343 (see Fig. 2) pivoted at 345 upon a hanger 347 suspended from the deck 27, said lever being provided with a lateral projection which engages beneath the outwardly projecting arm 349 formed on the holding pawl of the escapement mechanism. When the decimal trip lever 335 is located axially in its rearward or operative position and the carriage is located so that the master wheel 169 is in the units-of-dollars position of a register and a numeral key is depressed, the V-shaped projection extending upwardly at the end of the lever is engaged by the V-shaped cam 351 (see Fig. 3) projecting downwardly from the plate 283 secured to the base of the register. By the engagement of this cam with the decimal space lever, the lever is swung downwardly and the wire 341 is elevated to hold the escapement pawl 123 out of position to engage the escapement wheel 121, Fig. 2, until the carriage has executed a two-space or double escapement movement. This movement of the carriage disengages the projection on the decimal space lever from the cam 351, and the parts are then restored to their normal positions by the action of the coil spring 353 on the lever 343. With the decimal space lever located in its forward position, the V-shaped projection at the end thereof will not engage the cam 351 during the passage of the carriage through the zone of a register.

The decimal space lever is moved axially into and out of position to be engaged by the cam 351 by longitudinal movement imparted to the rock shaft 337 upon which the lever is mounted. The mechanism for moving the shaft longitudinally comprises a rock shaft 355 mounted in suitable bearings carried by the frame of the type carriage and having on one end a downwardly extending arm connected by a link 357 (see Fig. 4) with the arm 339 on the rock shaft 337. To the other end of the rock shaft 355 is secured a second downwardly extending arm 359 which is connected with lever 303 by means of a link 361 (see Fig. 5). To provide a lost-motion connection between the link and said lever, the link is formed with a slot 363 in which engages a pin 365 secured in the lever. The rock shaft 337 is acted upon by a coil spring 367 which constantly tends to move the same rearwardly to locate the decimal space lever in operative position, the rearward movement of the shaft being limited by the engagement of the hub of the arm 339 with a bracket 369 through which the shaft passes.

Crossfooter register mechanisms

As shown clearly in Fig. 2 of the drawings, the shaft 171 is extended beyond the side plates 195 of the type carriage at each end of said carriage and right and left-hand cross-computing registers or crossfooters 373 and 375 are mounted at the respective ends of the carriage. The totalizer mechanisms of these crossfooters are connected respectively with the ends of said shaft for operation by the shaft. The totalizer mechanisms of the crossfooters preferably are substantially identical, and each of these mechanisms has the same general construction, arrangement and mode of operation of parts as the corresponding mechanism illustrated and described in the patent to Foothorap, No. 2,145,254, dated January 31, 1939.

The mechanism for driving the totalizer of each crossfooter comprises a master wheel 200 (see Fig. 53) mounted on a shaft 202 to rotate therewith but shiftable longitudinally of the shaft to select the denomination of the totalizer mechanism corresponding with the denomination in which the master wheel 169 is located with relation to the column register. The master wheel 200 is driven by mechanism similar to that shown and described in Foothorap Patent No. 1,847,429, dated March 1, 1932, and in Foothorap Patent No. 2,032,691, dated March 3, 1936. The master wheel shaft 202 is journaled in bearings in the side plates 377 (see Fig. 2) of the crossfooter frame and is driven from the actuator shaft 171 through a gear 379 fixed to said shaft and meshing with a gear 381 journaled on and shiftable axially of the shaft 383 fixed to one of the side plates 377. When the machine is set for addition, the gear 381 is arranged to mesh with a gear 385 secured to the master wheel shaft. To set the crossfooter mechanism for subtraction, the gear 381 is shifted axially out of engagement with the gear 385 and into engagement with one section of a twin gear 387. The gear 387 is journaled on a shaft 389 secured to the adjacent side plate 377, and the other section of said gear is constantly in mesh with the gear 385, the gear 387 rotating idly when the machine is set for addition.

The value indicating wheels 194 are journaled on a shaft 391 mounted in the supporting plates 377 of the crossfooter frame and are arranged to be driven in opposite directions, respectively, for addition and subtraction by toothed denominational number wheels 198 journaled side by side on the shaft 393 supported in the crossfooter frame plates 377, said number wheels being connected with the value indicating wheels by intermediate gears 196. The master wheels of the two crossfooter registers are respectively shifted axially step by step to the right, looking at the front of the machine, into engagement successively with the wheels 198 to select the denominations corresponding to the denominations of the column register wheels successively engaged by the master wheel 169 by mechanism described later in this application.

Each crossfooter register is provided with a two-way transfer mechanism of the type illustrated and described in Patents No. 2,032,691 and No. 2,145,254, referred to above. This mechanism (see Fig. 59) includes a series of transfer heads 204, one for each denomination except the highest, mounted to rock upon a fixed shaft 206 to either side of a central normal position. Rocking movement of a transfer head is effected initially by the engagement of a wide tooth 206c on the corresponding denominational number wheel 198 with a trip member 226 on the head arranged in the plane of said tooth to rock the head in one direction or the other at the time in the movement of said wheel at which a transfer is required. Movement of the head is continued in the direction in which it is initially rocked by actuating mechanism including a bell crank actuator lever 214 pivoted at 216 on the frame of the crossfooter, a spring 218 connected with the downwardly extending arm of the lever and urging the forwardly extending arm of the lever toward the axis of the head and a link connection 208 between the head and the latter arm of the actuator lever. The arrangement of each head and its actuating mechanism is such that, in the normal position of the parts, they assume a dead-center position providing a toggle lock resisting the action of the spring 218, in which position they are yieldingly held by a pivoted detent 220 urged by a spring 222 against a roller 224 mounted on one end of the link 208. Combined carrying fingers and locking dogs 228 tensioned by springs 210 are mounted on each head and are each provided with a projection 212 arranged in the plane of the next higher denominational number wheel 198 to impart the carrying step of movement to said wheel upon the rocking of the head.

*Transfer resetting mechanism for crossfooter registers*

(See Figs. 8, 9, 53 and 59.)

After each of the transfer heads 204 is rocked into inclined position in the manner above described, to execute a carry, the head remains in this position until it is positively restored to the normal or upright position shown in Fig. 59. The present machine is provided with mechanism which operates, immediately after the master wheel 169 leaves the units-of-cents position in a column register, to restore automatically the transfer mechanism of the crossfooter or crossfooters which may then be in operation. This mechanism comprises a rod or shaft 401 carried by spaced arms 403 secured to a rock shaft 405 mounted to turn in bearings in the crossfooter frame. In restoring the transfer mechanism, the rock shaft 405 is turned in a clockwise direction (Fig. 53) thereby swinging the rod 401 downwardly into engagement with the projecting ends 407 of any of the actuator levers 214 which may have been swung upwardly out of normal position by the rocking of a transfer head, thereby swinging the horizontally extending arms of said levers downwardly therewith. This restores the links 208 and the transfer heads to their normal positions shown in Fig. 53.

The mechanism for thus actuating the rock shaft 405 (see Fig. 8) comprises an arm 409 secured to the rock shaft, a lever 411 fixed to a rock shaft 413 mounted in bearings 415 on the frame of the carriage and links 417 connecting the arm 409 with the lever 411. The rock shaft 405 is turned in the opposite direction by mechanism comprising an arm 419c secured to said rock shaft, a lever 421 pivoted at 423 on the frame of the crossfooter mechanism and connected with the arm 419c by a link 425. The lever 421 is acted upon by a coil spring 427 which constantly tends to swing the same in a counterclockwise direction (Fig. 8) and thereby to turn the rock shaft 405 in a clockwise direction.

The lever 411 is connected by a pitman 429 with a crank pin 431 fixed in a disk 433 journaled on a screw stud 435 threaded into a supporting bar or block 437 (see Fig. 9) secured to one of the side plates of the frame of the carriage, the pitman having a lost-motion connection with the lever 411 by means of a stud 439 secured in the lever and engaging in a slot 441 in the pitman. The disk 433 constitutes one element of a one-revolution clutch for actuating the pitman 429 and the arm 411. Pivoted at 443c on the disk is a pawl 445 arranged to engage the teeth of a ratchet wheel 447 journaled on the hub of the disk 433 (see Fig. 8). The pawl is acted upon by a leaf spring 449 which tends to swing the pawl into engagement with the teeth of the ratchet wheel 447. A gear wheel 451 is fixed to the hub of the ratchet wheel 447 and is continuously driven by means of a gear wheel 453 secured on an extension on the shaft 77 projecting beyond the adjacent side plate of the carriage.

The pawl 445 is held out of engagement with the ratchet wheel 447 during the movement of the master wheel 169 past the denominational number wheels 167 of a column register until the master wheel passes from the number wheel of the units-of-cents position by means of a detent lever 455 pivoted at 457 on a bracket 459 attached to the frame of the carriage, which lever carries a detent stud 461 arranged to engage the tail of the pawl, as shown in Fig. 8. The lever 455 is acted upon by a coil spring 463 which normally holds the lever yieldingly in position with the stud 461 in engagement with the pawl, the movement of the lever under the action of the spring being limited by means of a stop pin 465. When the master wheel 169 passes from the units-of-cents position in a register, the lever 455 is swung in a clockwise direction, Fig. 9, thereby disengaging the stud 461 from the tail of the pawl 445 to allow the same to be engaged with ratchet wheel 447 by the spring 449. Upon the engagement of the pawl with the ratchet wheel 447, the disk 433 is given a single rotation by said wheel and, during this movement of the disk, the lever 411 is swung downwardly by the pitman 429 thereby actuating the rock shaft 405 and the rod 401 to restore the transfer mechanism. Immediately after the lever 455 is actuated to cause the stud 461 to release the pawl 445, said lever is, itself, released by its actuating mechanism and, when the tail of the pawl has passed the stud, the lever is swung back to normal position by the spring 463 thereby locating the stud in the path of the tail of the pawl. As continued rotation of the disk 433 engages the tail of the pawl with the stud 461, the pawl is again disengaged from the teeth of the ratchet wheel 447, and the disk 433 comes to rest. To prevent reverse rotation of the disk 433 when the clutch is disengaged, a spring pressed dog 467 pivoted on the frame of the crossfooter is arranged to engage in a notch in said disk.

The present machine is provided with mechanism for moving the master wheel 200 of each of the crossfooter mechanisms from denomination to denomination (Fig. 53) along the series of numeral wheels 198 during the passage of the master wheel 169 of the column register actuating mechanism through the several denominations of a column register having the same general construction, arrangement and mode of operation of parts as the corresponding mechanism illustrated and described in Patent No. 2,145,254 and in part in Patent No. 2,032,691 referred to above. Each master wheel 200 is shifted by a master wheel carriage 469 movable on a guide 469a (see Fig. 7) in the direction of the axis of the wheel and connected by a link 471 to a forwardly extending crank arm 471a fixed to the upper end of a vertical rock shaft 473 mounted to turn in bearings in the crossfooter framework. A rearwardly extending arm 475 is fixed to the lower end of said shaft and is connected by a link 477a with one of a pair of longitudinally slidable coupling bars or slides 479 and 481 (see Figs. 7, 8 and 9), one for actuating each of the master wheel carriages. These bars are mounted side by side between a pair of laterally spaced housing plates 483 secured to the frame of the type carriage and said bars slide between upper and lower series of rolls 485. The rock shafts 473 are each acted upon by a coil spring 487 connected, in one crossfooter, with the arm 471a and, in the other crossfooter, with the arm 475 which tends to swing each shaft in a direction to maintain the corresponding carriage 469 in starting position with the master wheel 200 in a position just above the first numeral wheel 198. These springs, acting through the connecting mechanism, urge the coupling bars 479 and 481 to the left (Fig. 9). A coupling dog 489 is pivoted at 491 upon each of the coupling bars and is acted upon by a coil spring 493 which tends to swing the same upwardly into position to engage and interlock with a lug 495 on the base of each column register. A pin or stud 497 is mounted on each of the coupling dogs 489 and engages in an elongated slot 499 formed in the adjacent housing plate 483, the stud cooperating with cams formed at the opposite ends of the slot to swing the dogs downwardly out of engaging position with relation to the lug 495 on the column register.

Normally the dogs 489 lie in their upper or operative positions, one behind the other as illustrated in Fig. 9, with the pins 497 located in the left-hand portion of the corresponding slots 499 and adjacent to the respective cams at the ends of the slots (see Fig. 9). When the carriage has advanced the printing point to a position within one letter space of a columnar position on the work sheet in which a number is to be printed or a position at which the master wheel 169 of the column register actuating mechanism is within one space of the first number wheel 167 of a column register, the coupling dog or dogs 489 which are in operative position will engage the lug 495 on the column register and will hold the corresponding slide or slides stationary during the continued advance of the carriage. Because of the relative movement of the carriage upon which the crossfooter mechanisms are mounted and the slides 479 and 481, the corresponding master wheel or wheels 200 will be advanced from denomination to denomination across the corresponding series of numeral wheels 198. When the master wheel 169 advances one step beyond the lowest denominational order of a column register, the pin 497 on each coupling dog, which is then connected with the lug 495, engages the cam at the right-hand end of the corresponding cam slot 499 and the dog is depressed out of engagement with the lug thereby releasing the corresponding coupling slide. Each rock shaft 473 is then swung by the corresponding spring 487 in a direction to carry the master wheel 200 back to its normal or starting position, and the corresponding coupling slide is moved back to the left to its starting position shown in Fig. 9.

The clutch control detent lever 455 is swung in a clockwise direction, Fig. 9, to throw the one-revolution clutch into operation to actuate the resetting mechanism for each of the crossfooters, by the retracting movement of either of the coupling slides, following the release of the coupling dog from the lug 495, under the action of either of the springs 487. The mechanism for swinging the detent lever 455 from the movement of the slides comprises a connecting lever 501 pivoted at 503 on the detent lever 455 and connected by the spring 463 with the bracket 459, this spring normally holding the connecting lever in the position shown in Fig. 9 with relation to the detent lever with a projection 505 on the connecting lever in engagement with a stop pin 507 fixed to the detent lever. Thus, with the levers in the relative positions shown in this figure, the spring 463 tends to swing the detent lever 455 in a counterclockwise direction. To enable the connecting lever 501 to be actuated from the coupling slides, the lever is provided with two downwardly extending projections 509 and 509a, the projection 509a being arranged in front of and extending below the projection 509, as shown clearly in Figs. 8 and 9. The projection 509a is arranged to be engaged by a connecting pin 511 secured in the slide 479 and extending forwardly therefrom through a slot in the forward housing plate 483. The projection 509 is arranged to be engaged by a connecting pin 511a fixed in a bar 513 rigidly secured to the slide 481, said pin also extending forwardly from the slide through a slot in the forward housing plate 483. The length of the pin 511a is such that it does not project forwardly far enough to engage the projection 509a, as shown in Fig. 8. In order to enable the projections 509 and 509a to by-pass the pins 511 and 511a when the coupling slides are held stationary during the advance of the carriage, each of the projections is provided with a cam face 515 arranged to engage the corresponding pin.

The above described mechanism has the following mode of operation: Referring to the mechanism controlled by the coupling slide 479, when the slide is in its normal left-hand position, with relation to the housing plates 483, as shown in Fig. 9, the connecting pin 511 is located in the position shown in this figure with relation to the projection 509a on the connecting lever 501. When the slide is held stationary by the engagement of the coupling dog 499 when the lug 495 on a column register, the connecting pin 511 is engaged with the cam 515 on the projection 509a and the laterally extending arm of the connecting lever 501 is lifted to allow the pin to pass the projection after which the connecting lever is swung back to its normal position by the spring 463, these movements of the lever being produced without affecting the detent lever 455 which remains in its normal clutch disengaging position. When the coupling slide 479 is released by the action of the coupling dog, and the slide is moved back to the left by the slide actuating springs (Fig. 9), the connecting pin 511 engages the right-hand side of the projection 509a thereby swinging the detent lever 455 into the position to set in operation the one-revolution clutch. During this movement of the detent lever 455, the connecting lever 501 swings as a unit therewith, thereby carrying the projection 509a upwardly beyond pin 511 and the pin is restored to its normal position, shown in Fig. 9, by the movement of the coupling slide. After the pin 511 passes beyond the connecting lever 501, the levers 455 and 501 are restored to their normal positions, as shown in Fig. 9, by the action of the spring 463 so that the stud 461 on the lever 455 will again engage the tail of the pawl 445 to disengage the clutch as the disk 433 completes a revolution.

The one-revolution clutch is tripped in the same manner by the action of the coupling slide 481, the pin 511a on this slide acting on the connecting lever 501 to swing the detent lever 455 to trip the clutch during the retracting movement of the slide.

The one-revolution clutch shown in Fig. 8 is arranged to reset the transfer mechanisms of both the crossfooters in the event that the several transfer mechanisms have been operated during the passage of the carriage through the zone of a column register. To this end the rock shaft 413 is extended across the rear of the type carriage and one of the arms or levers 411 is attached to each end of the shaft. Mechanism connected with each of these levers having substantially the same construction as that shown in Fig. 8 is provided for restoring the transfer mechanism of each crossfooter. In the present application it has been considered necessary to show this mechanism only as applied to the left-hand crossfooter.

*General description of selector mechanism*

The machine illustrated in this application is provided with a total-taking mechanism applied to the right-hand crossfooter. When a total has been set up or registered in the right-hand crossfooter, this total may be automatically analyzed and printed on the work sheet and the crossfooter cleared by the total-taking mechanism hereinafter described.

Hereafter, in this application, whenever the crossfooter is referred to in connection with the total-taking mechanism, it is to be understood that the right-hand crossfooter is meant unless otherwise specified.

The indicating wheels of the crossfooter each have a code disk attached thereto so that the code disk rotates with the indicating wheel and the rotary position of the disk corresponds with the rotary position of the indicating wheel. The code disks are sensed or analyzed by means of a series of feelers arranged to engage successively these code disks. The feelers are mounted on the master wheel carriage for movement with the master wheel of the crossfooter in the direction of the axis of the code disks. The master wheel carriage is normally located to position the master wheel to the left of the accumulator train of the totalizer of the crossfooter of the highest denomination and the feelers are then located by the carriage to the left of the left-hand code disk or that disk attached to the indicating wheel of highest denomination. In taking a total automatically, the master wheel carriage is shifted to shift the master wheel from denomination to denomination of the accumulator trains of the totalizer of the crossfooter beginning with the highest denomination and is held stationary with the master wheel in registry with the accumulator train of each denomination to enable said train to be cleared by the rotation of the master wheel as is done in the taking of totals by manual operation of the key levers in machines of this type. The respective positions and movements of the feelers during the total-taking operation correspond with the positions and movements of the master wheel. That is, the feelers are shifted first into registry with the code disk attached to the indicating wheel of the accumulator train of highest denomination of the crossfooter and is then shifted from denomination to denomination of the code disks to correspond with the shifting of the master wheel. After completion of the total-taking operation, the master wheel carriage is shifted back to normal position to restore the master wheel and the feelers to their normal positions to the left of the accumulator train of the totalizer of the highest denomination.

During their shifting movement, the feelers are positioned radially out of position to contact with the code disks; and when the carriage is stationary, with the feelers in registration with a code disk, the feelers are moved inwardly toward the axis of the disks to analyze the disk. The feelers are respectively connected with a series of longitudinally movable permutation code bars, and the positions of the feelers determine the longitudinal positions of these bars. The edges of these bars are engaged by a series of selectors, one for each numeral type bar. These selectors are all given a forward movement during each cycle of operations, and when any one of the selectors is depressed into operative position, it will actuate the corresponding numeral key lever 87 to engage the type bar operating mechanism with the fluted or toothed shaft 77. The selectors are controlled by the permutation bars so that one and one only of said selectors will be depressed into operating position during each cycle of the total-taking mechanism, this selector corresponding with the position of the code disk analyzed by the feelers during the cycle.

*Feeler mechanism*

The feeler mechanism of the present machine (see Figs. 1, 17, 18, 19, 20, 21 and 23 to 37, inclusive) comprises a series of feelers 6 mounted on the master wheel carriage for movement therewith and for vertical movement with relation to said carriage. The feelers are mounted in spaced relation for vertical sliding movements in the forwardly projecting portions 8 and 8a formed on the master wheel carriage, the feelers operating in suitably formed slots, respectively, in said portions of the carriage. The slots in said forwardly projecting portions of the carriage are closed by means of a retainer plate 8b attached to the master wheel carriage and having forwardly bent slot closing arms 8c and 8d, as shown in Fig. 20.

The movement of the master wheel carriage shifts the feelers successively over the code disks 12, one of which is attached to each of the indicating wheels 194 of the totalizer mechanism of the crossfooter. When the master wheel is located in registry with the wheel 198 of the accumulator train, the feelers are located in registry with the code disk 12 of said train. As stated above, the master wheel carriage is normally located to position the master wheel to the left of the accumulator train of highest denomination of the crossfooter and to position the feelers to the left of the code disk attached to the indicating wheel of said train.

In each cycle of operations, the master wheel carriage is shifted to the right to locate the master wheel 200 in registration with the number wheel 198 of an accumulator train of the crossfooter and to locate the feelers 6 in registration with the corresponding code disk 12, the feelers being lifted during said movement of the carriage. The feelers are then depressed into engagement with the code disk. The position of the feelers controls a selector mechanism for selecting the type bar which is to be actuated in the cycle. Following the setting of the selector mechanism by the positioning of the feelers, the selected type bar mechanism is actuated to print on the work sheet a number corresponding with the position of the indicating wheel. Immediately following the printing of the number on the work sheet, the corresponding differential mechanism is actuated to rotate the master wheel to clear the accumulator train engaged by said wheel. This completes the cycle.

These cycles of operation are repeated to print the total appearing in the crossfooter register and to clear the register digit by digit until the total printing and clearing operation is completed.

Each of the code disks 12 preferably has substantially the construction illustrated in Figs. 23 to 34, inclusive. As shown in these figures, each code disk is provided with a periphery having certain elevated portions and depressed portions or notches formed in accordance with a predetermined code. There are ten differently formed portions on the code disks, having a code formation corresponding to the numbers from "0" to "9," inclusive. Figs. 25 to 34, inclusive, show respectively a code disk with the ten differently formed peripheral code portions, corresponding to the numbers from "0" to "9," in uppermost or analyzing positions, and the feelers 6 engaging respectively these differently formed code portions. Thus Fig. 25 shows the code portion 12a of a code disk corresponding to the number "0" in uppermost analyzing position, and the feelers 6 engaging this portion of the code disk. Fig. 26 shows the code portion 12b of the code disk corresponding to the number "1" in uppermost position with the feelers in engagement with this portion of the code disk. Figs. 27 to 34, inclusive, correspondingly show the code portions of the code disk corresponding to the numbers from "3" to "9" inclusive in uppermost or analyzing position with the feelers engaging these respective portions of the disk. It will be noted that, as shown in each of these figures, the elevations on each code portion of the disk hold the feelers, when engaged therewith, in elevated positions, and that the depressions or slots in each code portion allow the feelers to drop to depressed positions.

Figs. 35, 36 and 37 show successive positions occupied by a feeler during a cycle of operation of the feeler mechanism. Fig. 35 shows a feeler 6 located above the left-hand code disk 12 of the three code disks shown in this figure. The feeler occupies this position upon being first shifted to the right by the movement of the master wheel carriage or slide to bring the feeler into registration with the code disk. Thereafter the feeler is moved downwardly to analyze the left-hand code disk 12, as shown in Fig. 36. After the analyzing of the code disk, the feeler is lifted to substantially the position shown in Fig. 35 and is then moved in a right-hand direction to a position over the next code disk to the right as shown in Fig. 37. The cycle of operations of the feeler is then repeated.

Upon the upper edge of each of the feelers 6 rests a vertically movable bar 14 (see Figs. 17, 18 and 19) mounted upon the laterally extending arms of two bell crank levers 16 pivoted at 18 on the frame of the type head or carriage 7, the rounded ends of said arms of the bell cranks engaging in slots 20 formed in the opposite ends of the bar. The vertical movements of each of the bars 14 impart horizontal movements to one of the bars 22 mounted to slide horizontally upon the said type head and having slots 23a in which engage the rounded ends of the upwardly extending arms of the bell cranks 16. The bars 22 are slidably mounted on the type head by means of studs 24 secured in the frame of the type head and engaging in slots 26 in the bar.

With the above construction, the lateral position of each of the bars 22 is determined by the vertical position of one of the feelers 6. To the left-hand end of each of the bars 22 is connected the right-hand end of one of the code bars 28 which determines the numerals which are printed during the several cycles of the machine. The code bars 28 are connected with the respective bars 22 by means of a hook 28a formed on each bar 28 which engages with a hook 22a, Figs. 17 and 18, formed on each bar 22.

The mechanism for raising and lowering the feeler bars 6 comprises an actuator 30 having an arm or bar 32 mounted for vertical movement in slots in the forwardly projecting portions 8 and 8a on the master wheel carriage 469 by the side of the feeler bars. This actuator is provided with a rearwardly extending arm 34 projecting beneath each of the arms 10 on the feeler bars and engaged by said arms 10. The actuator is also provided with a shorter arm 34a (see Figs. 19 and 20) extending rearwardly beneath a vertically movable bar 36 mounted by the side of the forward bar 14 and supported in a manner similar to said bar. The actuator 30 is also provided with an upwardly extending arm 38 having a rearwardly bent extension 40 projecting over the upper edge of the bar 36, as shown in Figs. 19 and 20. This construction enables the actuator 30 to slide along the bar 36 during the movements of the carriage 469, but the actuator is moved vertically with said bar during the vertical movements of the bar.

The bar 36 is mounted upon the horizontally extending arms of bell cranks 42 pivoted at 44 on the frame of the type head, the said arms of the bell cranks engaging in slots 44a formed in the ends of said bar. The upwardly extending arms of the bell cranks are tied together by the engagement of the same in slots 44b formed in a longitudinally movable bar 46 mounted on the type head for horizontal movements by means of the pins or studs 24 which engage in slots 50 in the bar.

The bars 22 are separated by spacing plates 26a and one of these plates separates the forward bar 22 from the bar 46. A spacing plate 26a also is located back of the rear bar 22 in spaced relation to the backing and supporting plate 26b fixed to the frame of the type head. The spacing plates are mounted upon screw studs 26c and 26d supported on the backing plate 26b and passing through corresponding openings in the spacing plates and in the forward plate 26e. The screws 26c pass through and form pivots for the bell crank levers 16 and for the similar bell crank levers 42 hereinafter referred to. The spacing plates also separate the bars 14 from each other, and the forward bar 14 from the bar 36. The backing plate 26b, spacing plates 26a and the forward plate 26e enclose and form guides engaging lateral faces of the bars 22, the bar 46, the bars 14, and the bar 36. The pins 24, supporting the bars 22 and 46, fit in openings in the four forward spacing plates 26a and are held from endwise movement by the engagement of the forward plate 26e and the backing and supporting plate 26b with the forward and rear ends, respectively, of the pins.

The bar 36 is moved upwardly to lift the feeler bars prior to each denominational movement of the carriage 469, and prior to the return movement of the carriage to starting position, and is allowed to descend to permit the descent of the feeler bars when said bars are located in registration with a code disk. The mechanism for moving the bar 36 vertically comprises a link 52 (see Fig. 38), the upper end of which is formed with a forwardly extending projection 54 engaging in a slot 56 formed in the bar 36. The lower end of the link 52 is pivotally connected by means of an eccentric stud 58 to the arm 60 of a U-shaped lever, indicated as a whole at 62, and pivoted on a shaft 64 fixed to one of the side plates of the machine head. The lever 62 is formed with a blade 66 arranged to engage the inclined faces of the projections or teeth on a cam disk 68 fixed to the hollow shaft or bushing 70 mounted to turn on a fixed shaft 71a supported at its ends on the frame of the type head.

Formed on the lever 62 is a second arm 72 upon which is mounted a stud 74 having a square head arranged to engage the periphery of a timing disk 76 fixed to the bushing 70. The disk 76 is formed with projections or teeth 76a and with recesses or slots 76b between the teeth, as clearly shown in Figs. 38, 39 and 46. When the head of the stud 74 rests on the outer edge of one of the projections 76a of the disk, the arm 60 of lever 62 and the link 52 are held in elevated positions to locate the feelers 6 in their uppermost positions above the code disks. When the link 52 is depressed and the arm 72 of lever 62 is swung downwardly to engage the head of the stud 74 in one of the recesses 76b, the feelers 6 are located in lowered positions to engage one of the code disks 12. The link 52 is acted upon by a coil spring 76c connecting the same with the lever 120 hereinafter described, which spring tends to depress the link and to swing downwardly the arms 60 and 72 of lever 62.

Selector mechanism

Pivoted upon the shaft 64 is a second U-shaped lever 78, the arm 80 of which is connected by a stud 82 and a link 84 with an arm 86 fixed to a square shaft 88 having pintles 90 at its ends engaging in brackets 91a, Figs. 2 and 40, attached to the frame of the type head for carriage. To the shaft 88 are secured a series of brackets 92, Fig. 40, upon each of which is pivoted at 94 a selector 96 acted upon by a coiled spring 98 which tends to depress the forward end thereof. Each of the selectors 96 is formed with a spade-shaped pusher 100 arranged to engage the upwardly extending arm 102 of the corresponding numeral key lever 87. Each of the selectors may be held up in a position to locate the pusher blade 100 above the arm 102, on the corresponding key lever, so that the blade will not act on the key lever (see Fig. 15). The selector may be allowed to descend into a position back of the upper end of said arm, as shown in Fig. 40. To control the vertical position selectively of the selectors, each selector is formed with a forwardly extending arm 106 arranged to rest upon the upper edges of the four longitudinally movable control code bars 28 referred to above which are mounted for longitudinal movement in slots in supporting studs 110, Fig. 1, fixed to the upper portion of the frame of the machine head. The code bars 28 are each acted upon by a coiled spring 104 connecting an upwardly extending arm 108 on the code bar with a forwardly extending arm 108a formed on a fixed plate 110a attached by screws 112a to the frame of the type head of the machine. These springs tend constantly to move the code bars and the bars 22 to the left, Figs. 1 and 15, and to depress the bars 14 and the feelers. These code bars are provided with elevated, upper-edge portions 112 and with depressed upper-edge portions 114. When an elevated edge portion on any one of the code bars is engaged with the arm 106 on a selector, the blade 100 of said selector will be located above the corresponding arm 102 of the corresponding numeral key lever and the key lever will not be actuated by the selector during the movement of the selector-operating shaft 88. When depressed portions in all four selector code bars 28 are engaged with the arm 106 of a selector 96, the selector is held depressed in position to locate the blade 100 of the selector behind the arm 102 of the corresponding numeral key lever; and, as the selector-operating shaft 88 is given a clockwise movement, Fig. 38, the selector 96 will operate the key lever to connect the corresponding type bar mechanism with the fluted shaft. The longitudinal positions of the code bars are controlled, respectively, from the longitudinally movable bars 22 and the longitudinal positions of these bars are controlled by the feelers 6 as the code disks are sensed.

Upon the arm 80 of the U-shaped lever 78 is mounted a roller 116 arranged to engage a cam disk 118 fixed to the shaft 70. By the engagement of this disk with the roller, the lever 78 is actuated to raise and lower the link 84 and thereby actuate the shaft 88. Upon the shaft 64 is pivoted an escapement lever 120 having an inwardly directed blade 122 arranged to engage the cam projections on the cam disk 68 and having a set screw 124 mounted on the body of the lever and arranged to engage the corresponding portion of the lever 62 to actuate said lever to lift the link 52 and thereby lift the feelers of the sensing mechanism. The spring 76c tends to swing the lever 120 in a counterclockwise direction, Figs. 38 and 39. The lever 120 is actuated from each type bar mechanism or, to be more specific, from the universal bar, during each typing operation or cycle. To an arm 78a of the lever 78 is attached a relatively light coil spring 78b which tends constantly to swing the lever upwardly. The weight of the parts together with the tension of the springs 98, however, is sufficient to overcome the tension of the spring 78b so that, when the arm 80 of the lever 78 is free to swing downwardly, said lever is swung downwardly against the tension of the spring 78b.

The lever 120 is connected with one of the arms 143, upon which is suspended the universal bar, by means of a link 120a pivoted at 120b to said arm and having, at its lower end, a slot 120c in which engages a rod 120d supported on the lever 120. Through the above connection, during each depression of the universal bar, the lever 120 is swung in a counterclockwise direction about the shaft 64.

Spring winding mechanism for spring for operating control cam shaft (See Figs. 42, 43, 46 and 47.)

The control cam shaft 70, to which the disks 68, 76, and 118 are fixed, is mounted for rotation on the fixed shaft 71a and is rotated to actuate certain parts in the total-taking operation by means of a suitable spring. This spring is normally maintained in a wound-up or tensioned condition so that it tends to rotate the shaft 70 in a counterclockwise direction, Fig. 38, and the shaft is released to the action of the spring, upon the upward movement of the total-taking key lever after it is depressed. The spring for rotating the shaft 70 consists of a spiral spring 126, Fig. 46, one end of which is attached to a stud 128 fixed to the cam disks 118, 68 and 76. The other end of the spring is connected to a stud 130 fixed to a ratchet wheel 132 mounted on a bushing 133a, Figs. 42 and 47, also journaled on the shaft 71a inside the cam disk 118.

The ratchet wheel 132 is rotated step by step in a counterclockwise direction, Fig. 42, to wind up the spring 126. The mechanism for rotating the ratchet wheel comprises a link 134 pivoted at 136 on a lever 138 pivoted at 140 to the frame of the machine head. The lower end of the link 134 slides on a pin 134b fixed to the frame and engaged in a slot 134a formed in the link. The link 134 carries, at its lower end, a pawl 142 pivoted at 144 on the link and acted upon by a spring 146. This spring tends to maintain the acting or toothed end of the pawl in engagement with the peripheral teeth on the ratchet wheel 132. The lever 138 is acted upon by a coiled spring 148, the lower hooked end of which is engaged in any one of a series of notches 148a formed in said lever at the upper side of a slot 148b therein. This spring maintains the upper edge of the lever in engagement with a roller 150 journalled on a stud 152 mounted in an eccentric position on a disk 154 fixed to one end of the fluted shaft 71, by which the type bar mechanisms are actuated. By adjusting the spring 148 in the different notches 148a, the force exerted by the spring tending to lift the forward portion of the lever may be adjusted.

During the normal operation of the machine, the ratchet wheel 132 is free to turn in both directions, and, as the link 134 is reciprocated vertically, by the action of roller 150, the ratchet wheel turns in a counterclockwise direction, Fig. 42, during the upward movement of the link, under the action of the pawl 142, and then turns back in the opposite direction, under the action of the spring 126 during the downward movement of the link. Upon the depression of the total key lever, however, a pawl is thrown into operation which, after the movement of the ratchet wheel in a counterclockwise direction, produced by the upward movement of the link 134, prevents the ratchet wheel from returning in a clockwise direction so that the spring is wound up step by step by the reciprocation of the link 134. When the spring 126 reaches a predetermined tension, its force, tending to turn the ratchet wheel 132 in a clockwise direction, will equal the force of the spring 148, so that the spring 126 will not be wound any further.

The mechanism for holding the ratchet wheel 132 from turning back in a clockwise direction, after its movement in a counterclockwise direction, comprises a pawl 158 formed on a lever 160 pivoted at 162 on bracket 164 attached to the frame of the machine head. This pawl is acted upon by coiled springs 166 and 166a which tend to swing the same in a clockwise direction, Fig. 42, to engage the pawl with the ratchet wheel 132. The pawl, however, is normally maintained out of engagement with the ratchet wheel by means of a pawl retainer 168 pivoted at 170 on the total key lever 172, which lever is pivoted on the shaft 174 mounted in the frame of the machine head. The retainer 168 is acted upon by a spring 168a which tends to swing the same in a counterclockwise direction, Figs. 42 and 43, about the pivot 170. The key lever 172 is acted upon by a coiled spring 172a which tends to raise the forward key carrying portion of the lever and the movement of the lever in opposite directions is limited by means of a stop stud 172b mounted on the frame of the type head and arranged to be engaged by spaced stop faces 172c on the lever. The pawl retainer is formed with an arm 176 having a forwardly directed finger 178 arranged to engage a pin 180 fixed to the lever 160. The retainer 168 is provided with a second arm 182 spaced from the arm 176 and formed with a projection 184 which normally rests against a pin 186 mounted on the frame of the type head. Thus, when the key lever 172 is in elevated position, the retainer 168 is located in the position shown in Fig. 42, with the end of the projection 184 resting against the pin 186, and with the finger 178 engaged beneath the pin 180, thereby holding the lever 160 in position with the pawl 158 out of engagement with the ratchet wheel 132. Upon the depression of the key lever 172, projection 184 is carried downwardly and to the left beyond the pin 186, and the finger 178 is moved downward and to the left away from the pin 180; and when the projection 184 is completely disengaged from the pin 186, the retainer is swung downwardly and to the right into substantially the angular position shown in Fig. 43, the arm 182 then resting against the pin 186, as shown in this figure. During the continued downward movement of the key lever, after the pin 180 is released by the projection 178, the lever 160 is still held in position to hold the pawl 158 out of engagement with ratchet wheel 132 by a latch 188 pivoted at 190 on the frame of the machine and having a shoulder 192 arranged to engage a tail 192a on the lever, the latch lever being yieldingly held in latching position by spring 166a which is connected at its lower end to the lever. At a point adjacent the end of the downward movement of the key lever, the lower end of the arm 176 engages the latch lever 188 and depresses the same, thereby releasing the lever 160 and allowing the same to be actuated by springs 166 and 166a to engage the pawl 158 with the ratchet wheel 132.

Upon the elevation of the key lever, the retainer 168 moves diagonally upwardly and to the right, Fig. 43, until the movement of said parts is stopped by the engagement of the projection 184 with the pin 186, the arm 182 sliding along the upper side of said pin during this movement of the retainer. The upward movement of the retainer is thus arrested slightly before the finger 178 engages the pin 180. The retainer 168 is held substantially in this position during the rotation of the ratchet wheel 132 to wind up the spring 126 until the stud 130 engages the retainer and swings the same upwardly and to the left into substantially the angular position shown in Fig. 42. This movement of the retainer carries the lower end of the projection 184 beyond the pin 186, and the retainer is then moved a short distance upwardly and to the right by a short upward movement of the key lever, which locates the projection in a position opposite the pin 186. This final upward movement of the retainer, through the engagement of the finger 178 on the same with the pin 180, actuates the lever 160 to carry the pawl 158 out of engagement with the ratchet wheel 132. The latch lever 188 then swings upwardly to carry the shoulder 192 to the left of the tail of the lever 160 to hold the latter lever in pawl-disengaging position against the action of the springs 166 and 166a. The rotation of the ratchet wheel finally brings the stud 130 substantially to the position shown in Fig. 42, thereby releasing the retainer and the retainer is restored by the spring 168a to the position shown in this figure, with the end of the projection 184 resting against the pin 186.

*Mechanism for controlling rotation of cam disk assembly from total key lever*

(See Figs. 46, 48 and 49.)

The total key lever 172 is formed with a recess 338 in which engages a projection at the end of the upwardly extending arm of a lever 340 fixed to a rock shaft 342 mounted in the frame of the type head. Loosely pivoted on the shaft 342 is a lever 344 connected with the lever 340 by means of a pin 346 mounted on said lever and engaging in a slot 348 in the forwardly extending arm of the latter lever. The lever 344 is formed with a shoulder 350 arranged to be engaged by the flat side of the pin or stud 128 fixed to the cam disk assembly 118, 76 and 68, to hold the disk assembly from rotation. The engagement of the pin 128 with the shoulder 350 on lever 344 holds the disk assembly from rotation when the total key lever 172 is in its upper position. Upon the depression of the key lever, the lever 340 is swung in a direction to lift the lever 344, and thereby disengage the shoulder 350 from the stud 128. The disk assembly is then held from rotation by means of a finger 354 formed on the lever 340 which, by the swinging movement of the lever, is moved upwardly into position to engage the flat side of a second stud 356 also mounted on the disk 118. The engagement of this finger with the stud holds the disk assembly from rotation as long as the total key is held depressed. The end of the finger 354 is located so that there is a slight rotary movement of the cam disk assembly following the release of the same by the lever 344 before the rotation of said assembly is arrested by the finger. This slight rotary movement of the disk assembly carries the stud 128 beneath the curved face 358 of the lever 344.

Upon the release of the key lever, the finger 354 is swung downwardly out of engagement with the stud 356, allowing the disk assembly to rotate. During this rotation, the curved face 358 of the lever 344 engages first the stud 128 and then the studs 360 and 360a, also fixed to the cam disks.

The stud 360a is somewhat longer than the studs 360 and is arranged to extend behind the stud 130 carried by the ratchet wheel 132 so that the stud 360a cannot, at any time, get ahead of the stud 130. Thus, there is slightly less than a complete revolution between the position of the ratchet wheel 132 with relation to the disk assembly, when the coil spring 126 is completely wound up, and the position of said ratchet wheel with relation to the disk assembly when the coil spring is under its minimum tension.

*Mechanism for preventing misoperation of total-taking mechanism through erroneous operation of total key*

It may happen that, after the total key lever is depressed and released, said lever is again depressed, before a rotation of the cam disk assembly is completed, and held down until the end of the total-taking operation and then released. The second depression of the key lever will swing the lever 344 upwardly so that the shoulder 350 thereon will not engage the flat side of the stud 128 to arrest the movement of the disk assembly at the end of a rotation. The finger 354, however, will be swung upwardly into position to engage the flat side of the stud 356 to arrest the rotation of the disk assembly after slightly more than a complete rotation. Upon the release of the key lever after this second depression, the finger 354 will be disengaged from the stud 356 and the lever 344 will be depressed. The cam disk assembly, however, will have turned to a position such that the flat side of stud 128 has passed the shoulder 350 in said lever and the cam disk assembly will continue to rotate under the action of spring 126. This, of course, will give an erroneous result in the total-taking operation.

To avoid the above misoperation, a dog 362 is pivoted at 364 on the horizontally extending arm of the lever 340 and is acted upon by a coil spring 366 which tends to swing the forwardly projecting finger 368 on said dog upwardly with relation to lever 340. The finger 368 projects forwardly a slight distance beyond the forward end of the finger 354.

The length of the finger 368 is such that, when the total key is depressed, thereby swinging the finger 354 upwardly behind the flat surface of the pin 356, the finger 368, which is swung upwardly with the finger 354, engages the underside of the pin 356. The finger 368, therefore, has no function in the normal operation of the mechanism. However, when the total key lever is depressed and released to throw the total-taking mechanism into operation and, while the total-taking operation is being performed, the key is depressed again and is held in depressed position until after the completion of a rotation of the cam disk assembly and is then released, the finger 368 operates to prevent the misoperation, referred to above. As the total key is depressed during the total-taking operation and is held down, the lever 344 is swung upwardly to carry the shoulder 350 out of the path of the stud 128, and the finger 368 is swung upwardly with the finger 354. The end of the finger 368 is thus carried up into the path of the stud 356 and is engaged by said stud to arrest the rotation of the disk assembly slightly before the end of a complete revolution of said assembly. Then, when the total key is released, the finger 368 is swung downwardly out of engagement with the stud 356 to allow the cam disk assembly to rotate, and the lever 344 is swung downwardly to locate the shoulder 350 in position to be engaged by the stud 128 to arrest the rotation of the disk assembly after a slight rotation thereof.

*Cycle of cam disks and mechanisms operated thereby*

When the total-taking mechanism is idle, the cam disk assembly and the parts operated by the cams occupy substantially the positions shown in Fig. 38.

Upon the release of the cam disk assembly produced by the depression and release of the total key lever 172, the assembly is rotated in a counterclockwise direction, Fig. 38, under the influence of the coiled spring 126. During the first part of the rotation of the cam disk assembly, the rotation of the cam disk 76 carries the projection 76a, with which the said stud 74 is engaged, out of contact with said stud thereby releasing the lever 62. This lever is then actuated by one of the projections 68a on the cam disk 68 and by the spring 76c to depress the arm 60 of said lever and the link 52 to lower the feelers 6 into operating position, the lever 120 having previously been swung counterclockwise, Fig. 38, by the spring 76c to its limiting position. As the cam disk assembly continues to rotate, the projection 118a on the cam disk 118, which was engaged with the roller 116, releases said roller, the lever 78 is swung counterclockwise and arm 80 is depressed by gravity and the action of springs 98 (Fig. 40) to advance the type bar selectors 96. One of these selectors is then in lowered position and actuates a key lever 87 to connect the corresponding type bar mechanism with the continuously rotating toothed shaft 77. During the operation of said mechanism to advance the type bar, the initial step in the escapement movement of the type carriage takes place but this escapement movement is relatively slight. This type bar mechanism, in its operation, depresses the universal bar 145 and through the link 120a, the lever 120 is swung clockwise, Fig. 38, to swing the lever 62 clockwise to lift the arms 60 and 72 of said lever. The lifting of the arm 60 raises the link 52 to carry the feelers to their upper positions and the lifting of the arm 72 carries the stud 74 above the outer edge of the next projection 76a on the disk 76 and said projection is carried under the stud by the further rotation of said disk. These movements of the levers 62 and 120 place the blades 66 and 122 of said levers between two cam projections 68a on the disk 68. At about the same time, the arm 80 is lifted by the engagement of a projection 118a on the disk 118 with the roller 116 to raise the link 84 and restore the selector actuating mechanism and the selectors to normal positions. During the further rotation of the cam disk assembly, following the above-described actuation of lever 120, a projection 68a on the disk 68 engages the blade 122 on the lever 120 thereby holding up the rotation of the disk until the type bar mechanism moves back toward its normal retracted position and allows the universal bar 145 to swing upwardly and the lever 120 to swing counterclockwise under the influence of the spring 76c. During the retraction of the type bar, the second step in the escapement movement of the type carriage takes place, and this step constitutes the major part of the escapement movement. When the cam disk assembly is thus released by said lever, the cycle of said assembly is completed to bring the same to the position shown in Fig. 38, ready to start another cycle. The above cycle of operations is repeated, one cycle for each denomination in the total entered in the totalizer of the crossfooter, until the entire total is printed on the work sheet. During the taking of a total, the cam disk assembly executes nearly a complete rotation.

*Mechanism for setting the crossfooter*

(See Figs. 10 to 14, inclusive.)

The mechanism for setting the crossfooter for addition or subtraction comprises a carriage 517 upon which is mounted the shiftable gear 381. The carriage 517 is slidably supported on a guide bar or rod 519 secured at its ends to the side plates 377 of the crossfooter frame and is provided with an arm 521 engaging in a groove 523 in the hub of the gear 381.

The carriage 517 is moved longitudinally on the guide rod 519 by means of an arm 525 fixed to the forward end of a rock shaft 527 mounted to turn in bearings on the crossfooter frame, said arm having a pin-and-slot connection with the carriage. To the rear end of said shaft is attached an arm 529 having a pin 531 engaging in an angular slot 533 in the shifting lever 535 pivotally supported at 537 on a laterally shiftable slide 539. The slide 539 is slidably mounted on screws 541 and 543 engaging, respectively, in slots 545 and 547 in the slide and threaded into the crossfooter frame. Between its upper and lower ends, the shifting lever 535 is connected by a stud 549 with one end of a link 551, the other end of which is pivotally connected at 553 with a lever 553a pivoted at 555 on the frame of the type carriage. The lever 553a is connected to shift the shiftable gear for reversing the direction of rotation of the master wheel 169 for driving the column registers. The stud 549, connecting the shift lever 535 with the link 551, engages in a slot 557 in the lever (see Fig. 10) and is supported on a swinging arm 559 pivoted at 561 on the frame of the crossfooter.

The arm 525 is shifted to shift the carriage by swinging the shift lever 535 either about the pivot stud 537 or about the pivot stud 549. Fig. 10 shows the parts in normal or adding positions, with the gear 381 demeshed from the twin gear 387 and in mesh with the gear 385 (see Fig. 53). The position of the lever 553a is such that the driving mechanism for driving the master wheel of the column register is adjusted to drive said wheel in a positive or adding direction. It will be noted that, as shown in Fig. 10, the position of the lever 535 is such that the pin 531 is located in the central part of the cam slot 533. In setting the machine for subtraction by the depression of the subtract key, the lever 535 is swung to the right, Fig. 10, about the pivot 537, thereby locating the pin 531 in the left-hand portion of the cam slot 533, as shown in Fig. 11. This movement of said cam lever, through the engagement of the pin in the cam slot swings the arm 529, the rock shaft 527 and the arm 525 in a clockwise direction and shifts the carriage 517 and the gear 381 to the right to carry said gear out of mesh with the gear 385 and into mesh with the right-hand section of the twin gear 387, as shown in Fig. 11.

In setting the crossfooter for subtraction automatically under control of the type carriage, the shift lever 535 is swung in a clockwise direction about the pivot stud 549 by shifting the slide 539 to the right, as shown in Fig. 12. This movement of the lever locates the pin 531 in the right-hand portion of the cam slot 533 and, through the engagement of the pin in the slot, shifts the carriage 517 and the gear 381 to the right into the positions shown in Fig. 12 which are the same as shown in Fig. 11. The gear 381 then meshes with the right-hand section of gear 387. In this case the subtract key is not depressed and the column register is in condition for adding.

In setting the crossfooter for addition and the column register for subtraction, the slide 539 is shifted to the right and the stud 549 is also correspondingly shifted to the right so that the lower end of the lever 535 is maintained substantially in constant position laterally of the machine. The pin 531, the arm 529, the rock shaft 527, the arm 525 and the carriage 517 are, therefore, not shifted and the gear 381 is maintained in adding position.

The lever 553a and the lever 535 are shifted into subtract positions, as shown in Fig. 11, through a link 563, the left-hand end of which is pivotally connected with the lower end of the lever 553a. The right-hand end of the link 563 is pivotally connected with an arm 565 fixed to a rock shaft 567 mounted to turn in bearings on the type head. To this rock shaft is fixed a second arm 569 pivotally connected at 569a to the lower end of a vertically movably spring suspended link 338a hereinafter described. The link 338a is connected with the subtract key lever 573 by means of a link 571 the lower hooked end of which engages said lever, as shown in Fig. 10. The upper end of the link 571 is connected with the link 338a by means of a pin 571a which engages in a slot 571b in link 338a.

The lever 535 is shifted into subtract position, as shown in Fig. 12, with the lever 553a in normal or add position by mechanism comprising a lever 575—579 pivoted on an extension of the rock shaft 527, the upper arm 579 of which has a pin-and-slot connection 581 with the slide 539. This arm is acted upon by a coiled spring 583 which tends to swing the lever in a counterclockwise direction, Figs. 10 to 13, inclusive. The downwardly extending arm 575 of said lever is pivotally connected at 585 with one end of a link 587, the other end of which is connected by a pin-and-slot connection 589 and a spring link 591 with the lower end of an arm 593 of a bell crank lever pivoted at 595 on the casing plates 483 between which are mounted the bars 479 and 481 of the denominational shift mechanism of the crossfooter. The other arm 597 of said bell crank lever carries a roll 599 which is arranged to engage a cam 600 carried by the column register.

When the subtract key lever is in elevated position and the arm 597 of the bell crank lever 593—597 is depressed by the engagement of the cam 600 with the roll 599 upon the passage of the master wheel 169 into the register zone, through the connection described, the lever 535 is swung in a clockwise direction about the stud 549 thereby shifting the lower end of the lever to the left, Fig. 10, to engage the pin 531 in the right-hand portion of the cam slot 533 and shifting the carriage 517 to the right into a position shown in Fig. 12.

*Clearing of crossfooter*

The total is always taken with the type carriage in a position on the line space frame in the direction of letter-spacing movement such that the master wheel 169 is in the zone of a column register having a subtraction cam such as the cam 600 shown in Figs. 10 to 13, inclusive. Thus, when the totalizer of the crossfooter is in a positive condition, digits corresponding to those indicated by the indicating wheels 194 of the crossfooter and to those printed by the type bar mechanism will be subtracted in the several denominations of the totalizer, thereby clearing the totalizer.

In taking a total from the crossfooter, the state-control lever 315 is set in "compute" position and the type carriage is adjusted to locate the master wheel 169 in registration or in mesh with the wheels 167 of the accumulator train of highest order of the column register 163 which is to be used in the taking of totals, said register having a subtract cam 600 and a pickup lug 495 for moving the master wheel carriage 469 of the crossfooter 373. This locates the master wheel 200 in registration or mesh with the wheel 198 of the accumulator train of highest order of the crossfooter. The location of the type head in this position engages the roll 599 with the cam 600 on the column register, and the bell crank lever 593—597 is thereby positioned to adjust the driving mechanism for the crossfooter register into subtract condition. The total key is then depressed and immediately released.

The depression and release of the total key lever, by this actuation of the total key, releases the cam disk assembly to the action of the spring 126 and said assembly is rotated in the manner above described to cause the machine to execute as many cycles as there are denominations in the crossfooter. During each cycle, mechanisms controlled by the cams on the cam disks of the cam disk assembly are operated to perform the following operations:

The feelers 6 are actuated to analyze the code disk of the indicating wheel 194 of the denomination with which the master wheel 200 is in registration, the code bars 28 are positioned in accordance with the positions of the feelers, the selector lever 96, corresponding to the number indicated by the wheel 194, is allowed to be depressed into operating position, said lever is advanced to actuate the key lever 87 to connect the corresponding type bar mechanism with the continuously rotating fluted or toothed shaft 77 and the type bar mechanism is actuated to print the digit indicated by the indicating wheel upon the work sheet. The depression of the universal bar 145 produced by the type-impression movement or stroke of the type bar mechanism actuates the escapement to cause a relatively slight escapement movement of the type head.

The type bar mechanism, in its type-impression stroke, engages the corresponding differential actuator rack 173 with the power driven toothed or fluted shaft 193 to drive the rack in an upward direction for the distance required for the subsequent operation of the differential mechanism. The rack is then disengaged from the shaft 193 and the differential mechanism of which it forms a part is moved in a downward direction by suitable springs. The differential mechanism, during its downward or return movement, or during a part of said movement, is connected with the driving mechanism for the crossfooter register and the accumulator train with which the master wheel 200 is engaged is actuated in a subtract direction to clear the indicating wheel of said train. The upward movement of the universal bar, during the retracting movement of the type bar mechanism, actuates the escapement to allow the type head to execute the second step in the escapement movement. The greater part of the escapement movement occurs during this second step.

The above cycle of operations is repeated until the entire total in the crossfooter is printed and the crossfooter is cleared. The final escapement movement of the type carriage carries the master wheel 169 to a position one step beyond or below the lowest denomination of the column register and the master wheel 200 below the lowest denomination of the crossfooter and the carriage 469 is released during this final escapement movement and is restored to normal position, as shown in Fig. 7, by the spring 487, the master wheel 200 thus being located one step above or to the left of the highest denomination of the crossfooter.

*Negative total taking*

The present machine is provided with a fugitive one mechanism which enters an additional one negatively in the units train of the totalizer of the crossfooter when said totalizer is driven from a positive condition in a negative direction from zero to "9" and which enters an additional one positively in the totalizer of the crossfooter when said totalizer is driven from a negative condition in a positive direction from "9" to zero.

The present machine is also provided with mechanism by which, when the totalizer of the crossfooter has been operated in a negative direction from zero to "9" thereby setting up a total in complementary form in said totalizer, and this total is analyzed by the feeler mechanism, the type bars are selected to print the true total on the work sheet. When the totalizer of the crossfooter is turned from a positive condition in a negative direction from zero to "9," the selector levers are shifted automatically longitudinally of the code bars to complementary positions. Then, when the total key is depressed and released, the code disk feelers analyze the complementary indications on the code disks, but the type bar selector levers select the numeral type bars for the digits making up the complement of the number indicated in the crossfooter. That is, a complement of the complement set up in the crossfooter is printed by the type bars. When the totalizer of the crossfooter is driven from a negative condition in a positive direction from "9" to zero, the selector levers are automatically shifted back longitudinally of the code bars to normal positions.

Fig. 16 of the drawings shows, in dotted lines, the positions of the lower edges of the forwardly projecting arms 196 of the selector levers with relation to the code bars 28. There is one of the selector levers for each of the digits from "1" to "9," inclusive, a lever for "0" and a lever for star printing. The right-hand or normal position and the left-hand or complementary position of each lever are bracketed in Fig. 16, and the digit to which each lever corresponds is placed adjacent the bracket.

The formations of the upper edges of code bars 28 are such that, when a selector lever 96 is in its right-hand position shown in Fig. 16 and the feelers 6 analyze the indication of a certain number on a code disk 12, the selector lever corresponding to this number will be allowed by the code bars to be depressed into operating position and that, when the selector levers are in their left-hand positions shown in this figure and the feelers analyze the indications of a certain number on a code disk, the selector lever corresponding to the complement of said number will be allowed by the code bars to be depressed into operating position.

In order to locate the parts for taking a complement of a complement, the selector levers 96 are all shifted to the left from their right-hand positions shown in Fig. 16 to the left-hand positions shown in said figure. This is done by shifting the devices for supporting and actuating the levers.

As stated above, the levers 96 are pivotally supported upon the rock shaft 88 and are actuated by said shaft. The forwardly projecting arms 196 of the levers pass, respectively, through slots 230, Fig. 15, respectively, formed in the downturned portions 232 of a slide 234 mounted to slide longitudinally on the angle plate 236 attached to the frame of the type head. The slide 234 is held on the angle plate and guided during its longitudinal movements by means of studs 238 engaging, respectively, in slots 240 in the slide, washers 242 being placed between the heads of the studs and the slide. The rock shaft 88 is mounted for longitudinal movement in its supporting bearings on the brackets 91a. An arm 244, Figs. 15 and 40, projecting rearwardly from the slide 234 engages in a groove or slot 246 in the rock shaft 88 to cause the rock shaft to move longitudinally with the slide.

The mechanism for moving the slide 234 to shift the levers 96 and their actuating mechanism comprises a lever 248, Fig. 15, pivoted at 250 on a bracket 252 adjustably attached to the frame plate 254 of the machine head. The lever 248 is formed with an opening 256 adjacent the upper end thereof in which engages the reduced end of an arm 258 projecting forwardly from the slide 234.

With the above construction, the lever 248 is swung in a counterclockwise direction from the position shown in Fig. 15 to shift the slide 234, the shaft 88, and the selector levers 96 to the left to complementary positions with relation to the code bars 28. The mechanism for swinging said lever comprises a lever 266 pivoted on a stud 268 also carried by bracket 252 on which lever is fixed a pin 264 engaging in a slot 262 formed in a laterally extending arm 260 on the lever 248. The right-hand end of the lever 266, Fig. 15, is adjustably connected with the upper end of link or bar 270, the lower end of which is pivotally connected at 272, Fig. 50, with a lever 274 pivoted at 276 on the frame of the machine head. The lever 274 is provided with a recurved arm 278 which is pivotally connected at 280 with a lever 282 suspended by means of a link 284 upon a pin 286. This pin is supported on the rear end of the arm 288 of a U-shaped lever, pivoted on the shaft 290 supported on the frame of the machine head. The other arm 292 of this U-shaped lever carries, at its rear end, a pawl 294 (see Fig. 51). The lever 288, 292 is acted upon by a coil spring 294a which tends to swing upwardly, the arms 288 and 292, the pin 286, the link 284 and lever 282, and the upward movement of said parts is limited by the engagement of lever 282 with the shaft 174. The pawl 294 is pivoted on a stud 294a carried by the arm 292 and is acted upon by a coil spring 300 which tends to swing the same in a clockwise direction, Fig. 51. The movement of the pawl 294, under the action of the spring, is limited by the engagement of an arm 302 on the pawl with the underside of the arm 292.

The wheel 198 of the accumulator train of highest order of the register is rotated in a clockwise direction, as indicated by the arrow in Fig. 50, during the adding of a number in the said train and is rotated in the opposite or in a counterclockwise direction during the subtraction of a number in said train. During the rotation of the wheel 198 of said train in a clockwise direction, the pin 306 mounted on the wheel engages the right-hand side of the pawl 294, Fig. 50, and swings the same in a counterclockwise direction about its axis against the tension of the spring 300, the pawl being restored to normal position by the spring when the pin 306 passes the pawl. During the rotation of the wheel 198 in a counterclockwise direction, the pin 306 engages the end of the pawl 294 and, because of the position of the pin with relation to the axis of the pawl, the pin does not swing the pawl about its axis but drives the same downwardly thereby swinging the arm 292 and the arm 288 of the U-shaped lever 288, 292 downwardly therewith. This action occurs when the wheel 198 is turned from a zero position in a subtracting direction to a "9" position. The downward movement of the arms of the U-shaped lever causes the lever 282 to swing downwardly about its pivot 280.

The total key lever 172, as stated above, is pivoted on shaft 174 mounted on the frame of the machine head and carries a square stud 312, Fig. 50, which, when the lever 282 is in depressed position, engages a downwardly projecting hook portion 314 on the lever 282 as the key lever is swung downwardly to cause the machine to take a total. The lever 282 is held in its uppermost position by the link 284 and the U-shaped lever 288, 292 at all times, except when a complement of a complement is to be taken. With the lever 282 in its uppermost position, the stud 312 will not engage the hook-shaped portion 314 of the lever 282 as the key lever is swung downwardly to cause the machine to take a total. When the number wheel of the accumulator train of highest order of the crossfooter is driven in a subtracting direction from zero position to "9" position, the driving of the U-shaped lever 288, 292 downwardly carries the lever 282 downwardly to position the hook-shaped portion 314 in the path of the stud 312. With the lever 282 in this position, as the key lever is pressed downwardly, the stud 312 engages the projection 314 on lever 282 during the downward movement of the key lever and the lever 282 is moved rearwardly, thereby swinging the lever 274 in a clockwise direction, Fig. 50, about the stud 276 and moving the bar or link 270 downwardly thereby shifting the levers 96 and their actuating mechanism across the machine into positions to take a complement from the code disks of the register.

The lever 274 is held in complement-taking position by means of a latch 316 pivoted at 318 on the frame of the machine head and having a shoulder 320 arranged to engage a pin 322 mounted on the lever 274. The latch 316 is acted upon by a coil spring 324 which tends to swing the same in a counterclockwise direction, Fig. 50, into acting position.

The latch 316 is swung in a clockwise direction to release the lever 274 upon the automatic actuation of the transfer-restoring mechanism of the crossfooter. To this end, a link 326 is pivoted at its lower end at 328 to the latch 316 and adjacent its upper end is formed with a curved slot 330, in which engages a pin 332 carried by an arm 334 attached to the rock shaft 405 of the transfer-restoring mechanism. As the rock shaft 405 is actuated to restore the transfer mechanism of the crossfooter, the arm 334 and the pin 332 are swung upwardly in the slot 330. During the greater part of the upward movement of the pin 332, the pin moves in the slot 330 in the link 326 and, therefore, does not move the link. As the pin approaches the ends of its upward movement, it engages the upper end wall of the slot 330 and lifts the link 326, thereby actuating the latch 316 to disengage the pin 322 on the lever 274 and release said lever. Upon the release of said lever, the parts are moved back to their normal positions by the action of a suitable spring-actuated mechanism and the link or bar 270 is lifted to restore the levers 96 and their actuating mechanism to their normal right-hand positions, shown in Fig. 15.

The spring-actuated mechanism for restoring the link or bar 270 (see Fig. 15) comprises a bell crank lever 334a pivoted at 335a on the frame of the type head and a link 336a connecting the downwardly extending arm of said lever with the lever 248. The horizontally extending arm of the lever 334a is connected with the upper end of a vertically movable link 338a by means of a pin 340a fixed in said arm and engaging in a slot 342a in the link. The link 338a is yieldingly held in its uppermost position with the pin 340a in engagement with the lower end wall of the slot 342a by means of a coiled spring 344a suspended from the forward end of an arm 346a fixed to the frame plate 234, said spring being connected to the upper end of the link.

With this construction, as the link or bar 270 is moved downwardly, the bell crank lever 334a is swung in a counterclockwise direction, Fig. 15, and the spring 344a is stretched. Upon the release of the lever 274 by the latch 316, the bell crank lever 334a is swung back in a clockwise direction by the upward movement of the link 338a under the action of the spring 344a and the lever 248 is swung in a clockwise direction to restore the selector levers 96 to their normal right-hand positions. At the same time, through the action of the spring 344a, the lever 266 is swung in a counterclockwise direction to lift the link 270 and restore the levers 274 and 282 to their normal positions.

The fugitive one mechanism is fully shown and described in applicant's co-pending application Serial No. 18,143, filed March 31, 1948, now Patent No. 2,573,508, issued October 30, 1951, and, therefore, need not be described in the present application.

The present machine is provided with mechanism by which, when a credit balance or negative total is taken, the total will be printed in distinctive type different from that employed in printing a positive total. Each of the type heads carried by the respective numeral type levers is provided with two different kinds of type and, when the total key is depressed to print a credit balance total, a case-shifting mechanism is rendered operative to shift case from the type used in printing a positive total to type of a different character.

Each of the type heads 544, mounted on the numeral type levers 19, is pivoted at 546 on the lever and carries two types 548 and 550 located thereon substantially as shown in Fig. 3. The case-shift mechanism comprises a trip ring and mechanism for shiftably supporting and controlling the ring having substantially the same construction, arrangement and mode of operation as the corresponding mechanism illustrated and described in the Patent No. 2,334,464 to Elmer L. Wise, dated November 16, 1943. The type head 544 is normally held in position on said type lever 19 so that the type 550 is located in position to engage the work sheet. This type is of the ordinary character and is used in printing positive totals. The type head is held in normal position on the type lever by means of a leaf spring 552.

When the total key is depressed to cause the printing of a credit balance total, the type head 544 is adjusted in a clockwise direction above the axis 546 to bring the type 548 into position for printing. This type is of a distinctive character.

The mechanism for thus shifting the type head comprises a trigger or lever 554 pivoted on said head and a trip ring 556 arranged to be engaged by the outer end or tail on said lever during the downward or type-impression stroke of the numeral type bar. The type head retaining spring 552 and lever 554 have substantially the same construction as the corresponding parts illustrated and described in the patent to Foothorap No. 1,119,149, dated December 1, 1914. The trip ring 556 is pivotally supported at 558 on the spaced arms 560 fixed to a rock shaft 562 mounted to turn in suitable bearings on the frame of the type head of the machine. The trip ring is provided with upwardly extending arms 562a connected with the forward ends of the arms 560 by pin-and-slot connections which limit the swinging movement of the trip ring with relation to the arms 560. The forward portion of the trip ring normally engages a stop plate 564 formed by a part of the casing of the type head of the machine. During the downward movement of the arms 560, the forward portion of the trip ring engages a stop plate 566 formed on a bracket attached to said casing and this causes the trip ring to swing in a clockwise direction about the pivots 558 to depress the rear portion of the ring into position to be engaged by the tail of lever 554 on the type head. When the arms 92 swing back upwardly to normal position, the forward portion of the trip ring engages the stop plate 564 and this swings the trip ring back in a counterclockwise direction about the pivots 558 to raise the rear portion of the ring out of the path of the tail of the lever 554. The rock shaft 562 is acted upon by a coil spring 568 connected to an arm 570 fixed to the rock shaft which normally holds the arms 560 and the trip ring in elevated position.

As stated in the previous description, when the register of the crossfooter is in a negative condition and the total key is depressed, the lever 274 is swung in a clockwise direction, Fig. 50, about its pivot 276. A connection is provided between the rock shaft 562 and said lever by which the rock shaft is then swung in a counterclockwise direction, Figs. 3 and 50. To this end, an arm 570 (see Fig. 50) is fixed to the rock shaft 562 and the forward end of said arm is arranged to be engaged by a projection 572 extending rearwardly from the lever 274.

With this construction, as the lever 274 is swung in a clockwise direction, Fig. 50, upon the depression of the total key, the projection 572 of said lever swings the arm 570 downwardly thereby depressing the trip ring into operating position. Upon the restoration of the lever 274 to normal position after the completion of a total-taking operation, the trip ring is restored to normal position by the restoring spring 568.

The printing of a total when the key of the subtraction lever 573a (see Fig. 3a) is depressed will result in a misoperation. The machine is, therefore, provided with mechanism for locking the total key from depression when the subtraction key is depressed. This mechanism comprises a locking lever 574 (see Figs. 50 and 52) pivoted at 576 on the frame of the type carriage and having a forwardly projecting arm 578 which rests on the upper side of the arm 570 attached to the rock shaft 562. The locking lever 574 is acted upon by a coil spring 578a which tends to swing the lever in a counterclockwise direction about its axis. The lever 574 is formed with an upwardly extending locking projection 580 arranged to be engaged by a stud 582 fixed to and extending laterally from the total key lever 172. The arm 578 on the locking lever 574 is normally supported in a position such that the locking projection 580 on said lever is located to the rear of the stud 582, as shown in dotted lines in Fig. 52. With said projection located in this position, the locking lever does not interfere with the depression of the total lever. When the key of the subtraction lever 573a is depressed, the rock shaft 562 is swung in a counterclockwise direction, Fig. 3a, by means of a roll 584 mounted on the subtract lever 573a and arranged to engage a cam face 586 on an arm 588 secured to said rock shaft, all as shown and described in said Patent No. 2,334,464 referred to above. The turning of the rock shaft causes the depression of the arm 578 on the locking lever 574 and the movement of said lever then brings the locking projection 580 into a position beneath the stud 582 on the total key lever, as shown in full lines in Fig. 52, thereby locking the latter lever from depression.

The depression of the total key to initiate the taking of a total when the master wheel of the crossfooter is located in any denomination below the highest denomination of the crossfooter may result in a misoperation. The present machine is, therefore, provided with mechanism for locking the total key at all times except when the master wheel of the crossfooter is located in the highest denomination thereof.

This locking mechanism (see Figs. 42, 54, 55 and 56) comprises a slide 590 mounted to slide longitudinally in suitable guides formed in the spaced frame plates 377 of the right-hand crossfooter. This slide is acted upon by a coil spring 596 which tends to move the same to the right, Figs. 54 to 57, inclusive, and the movement of the slide under the influence of the spring is limited by the engagement of a pin 598 carried by the slide with the right-hand frame plate 377. The lower edge of the slide 590 normally lies above the rearwardly projecting portion or tail 600a formed on the total lever 172 so as to lock the lever against depression. The slide, however, is formed with a slot 602 arranged to receive the tail 600a on the lever when the master wheel of the crossfooter is in the highest denomination of the crossfooter.

The longitudinal position of the locking slide 590 is controlled from the arm 475 on the rock shaft 473 which moves with the master wheel carriage. To this end, the locking slide is formed with a projection 604 arranged to be engaged by said arm 475, as shown in Figs. 42 and 54.

The position of the projection 604 on the locking slide is such that, when the master wheel carriage is in position to locate the master wheel out of operative position above the highest denomination of the crossfooter, the slide will be located substantially in the position shown in Figs. 42 and 54. In this position of the slide, the lower edge thereof is located above the tail 600a of the total lever and the lever will be locked from depression. As the master wheel carriage moves into position to locate the master wheel in the highest denomination of the crossfooter, the movement of the arm 475 allows the locking slide 590 to move under the influence of the spring 596 to the position shown in Fig. 55, in which the slot 602 is opposite the tail 600a on the total lever in position to receive said tail. With the locking slide in this position, the total lever is unlocked and may be freely depressed. As the master wheel carriage moves to the next denomination below the highest denomination of the crossfooter, the locking slide 590 is moved to the right, Figs. 54 to 56, inclusive, by the spring 596 substantially into the position shown in Fig. 56. When the locking slide is in this position, its lower edge lies above the tail 600a on the locking lever and the locking lever is locked against depression. The pin 598 is located in the locking slide to engage the right-hand frame plate 377 when the slide reaches the position shown in Fig. 56 and prevents further movement of the slide to the right under the influence of the spring 596. The locking slide continues in the position shown in Fig. 56, to lock the total lever from depression, throughout the movement of the master wheel carriage through the different denominations of the crossfooter below the highest denomination. The total lever is, therefore, locked against depression at all times except when the master wheel carriage is located to position the master wheel in the highest denomination of the crossfooter.

The machine is provided with means for controlling the locking slide 590 to lock the total lever at all times when the state-control lever 315 is adjusted to condition the machine for writing. The mechanism for thus controlling the locking slide comprises a locking bail 606 bent substantially in the form shown in Fig. 42.

This bail is provided with a pivot portion 608 pivotally attached by plates 610 to the frame of the type head and is formed with an arm 612 extending at substantially right angles to the pivot portion and arranged to be located opposite the left-hand end of the locking slide 590, Fig. 42, to hold the said slide from leftward movement. The bail is further provided with an arm 614 located substantially parallel with the arm 612 and an extension 616 substantially parallel with the pivot portion of the bail and arranged to be engaged by the rear side of the decimal trip lever 335. To the right-hand plate 610, Fig. 42, is attached a leaf spring 620 having a laterally bent arm 618 arranged to be engaged by the arm 612 of the bail 606.

The lever 315 controls the axial position of the rock shaft 367 and of the decimal trip lever as well as the angular position of the rock shaft 259. The lever 315 is shown in full lines in Fig. 5 in the position in which it is adjusted to condition the machine for the actuation of the totalizer mechanism and for the operation of the decimal space mechanism when the type carriage is in a register zone. This figure also shows, in dotted lines, two other positions of the lever 315 indicated, respectively, at A and B, the full-line position of the lever being indicated at C. With the lever 315 adjusted in the position A, the rock shaft 259 is positioned to locate the interposer 253 in a position such that the actuator mechanism for the totalizers of a register will not be thrown into operation and the demical trip lever 335 is located axially out of position to engage the cam 351 when the carriage is in the zone of a register. The position A is the position in which the lever 315 is adjusted for writing only. With the lever 315 in the position B, the machine is conditioned for the typing of totals by manual actuation of the key levers without computing when the carriage is in the zone of a register. When the lever is shifted from the position A to the position B, the lever 303 is actuated to allow the decimal trip lever 335 to be moved rearwardly to operative position by the action of the spring 367 but the lever 295 remains stationary, the pin-and-slot connection between the lever 295 and the lever 303 allowing this movement of the latter lever independently of the lever 295. With the lever 305 in the position C shown in Fig. 5, the machine is conditioned for the actuation of the totalizer mechanism of a register when the carriage is in a register zone as stated above. Upon the shifting of the lever 315 from the position B to the position C, the lever 295 is actuated to turn the rock shaft 259 to locate the interposer 253 in the position shown in Fig. 6 so that the actuating mechanism for the totalizer will be thrown into operation upon the depression of a numeral key when the type carriage is in the zone of a register. During this shift of the lever 315, the link 361 and the connections between the same and the decimal trip lever remain stationary, the relative movement between the lever 303 and the link being permitted by the lost-motion connection between these two parts.

The reverse operations take place upon shifting the lever 315 from the position C to the position B and from the position B to the position A shown in Fig. 5, as will be readily understood by those skilled in the art.

The decimal space mechanism and the mechanism for enabling and disabling the differential actuator mechanism above described have substantially the same construction, arrangement and mode of operation as the corresponding mechanisms illustrated and described in applicant's Patent No. 2,370,505, referred to above.

Fig. 42 shows the decimal trip lever 335 and the rock shaft 337, upon which the trip lever is mounted, in their rearward positions which they occupy when the trip lever is set for computing or the typing of totals without computing. With said rock shaft and the decimal trip lever in these axial positions, the bail 606 is located by the spring 620 in the position shown in full lines in Fig. 42 in which the arm 612 does not obstruct the leftward movement of the slide 590 so that said slide may move to the left, Fig. 42, into the position shown in Fig. 55. When the state-control lever 315 is swung from compute or total position into position for writing, the rock shaft 337 and the decimal trip lever 335 are moved forwardly against the action of the spring 367, and the bail 606 is actuated to swing the arm 612 forwardly into the position shown in dotted lines in Fig. 42. With the arm 612 of the bail in this position, the leftward movement of the slide 590 is obstructed and the slide remains substantially in the position shown in Figs. 42 and 54 during the writing operation. The slide, when in this position, locks the total key against depression to initiate a total-taking operation.

It is to be understood that the construction illustrated and described in this application is merely illustrative of the invention and that the invention is not limited to the particular form thereof herein disclosed but that the invention may be embodied in other forms within the scope of the claims.

Having explained the nature and object of the invention and having specifically described a machine embodying the invention in its preferred form, what is claimed is:

1. In a combined typewriting and accounting machine of the class described having power means, a platen, a plurality of type bar mechanisms, selectively operable means to connect said type bar mechanisms with said power means to type selected characters on a work sheet supported on said platen, a register, register operating means controlled by said selectively operable means to enter values, digit by digit, in said register, analyzing mechanism successively shiftable into engagement with successive denominational orders of said register to control said selectively operable means to print, digit by digit, the values in said register orders, a function control key operable to initiate operation of said analyzing mechanism and a state control member movable into a plurality of positions to determine effectiveness of said register operating means, the combination of a lock slide to control operation of said function control key, means to urge said lock slide from a normal locking position to a releasing position and through such position to a second locking position, a lever connected to said analyzing mechanism to hold said lock slide in its normal position but movable with said analyzing mechanism to free said slide for movement to its releasing position when said analyzing mechanism is in engagement with the highest denominational order of said register, and to the second locking position when the analyzing mechanism is in engagement with any other denominational order, and a blocking member settable by said state control member in one position to prevent releasing movement of said locking slide.

2. In a combined typewriting and accounting machine of the class described having power means, a platen, a plurality of type bar mechanisms, selectively operable means to connect said type bar mechanisms with said power means to type selected characters on a work sheet supported on said platen, a register, register operating means controlled by said selectively operable means to enter values, digit by digit, in said register, analyzing mechanism successively shiftable into engagement with successive denominational orders of said register to control said selectively operable means to print, digit by digit, the values in said register orders, a function control key operable to initiate operation of said analyzing mechanism and a state control member movable into a plurality of positions to determine effectiveness of said register operating means, the combination of a locking member, a lever connected to said analyzing mechanism to hold a locking surface of said locking member in position to prevent effective operation of said function control key, a blocking arm connected to said state control member to hold said locking member in said position while said state control member is in one of its positions, means urging said locking member to follow said lever of said analyzing means to release said function control key when said analyzing mechanism is in engagement with a selected denominational order of said register and said state control member is in another of its positions, and a second locking surface on said locking member to prevent operation of said function control key in any other position of said analyzing mechanism.

OSCAR J. SUNDSTRAND.

REFERENCES CITED

The following references are of record in the file of this patent:

UNITED STATES PATENTS

| Number | Name | Date |
|---|---|---|
| 1,355,258 | Pentecost et al. | Oct. 12, 1920 |
| 1,396,326 | Goldberg | Nov. 8, 1921 |
| 1,854,875 | White | Apr. 19, 1932 |
| 2,033,045 | Mehan | Mar. 3, 1936 |
| 2,060,167 | Breitling | Nov. 10, 1936 |
| 2,087,542 | Muller | July 20, 1937 |
| 2,370,505 | Sundstrand | Feb. 27, 1945 |
| 2,468,408 | Racz | Apr. 26, 1949 |